United States Patent [19]

Klun et al.

[11] Patent Number: 5,667,541
[45] Date of Patent: Sep. 16, 1997

[54] COATABLE COMPOSITIONS ABRASIVE ARTICLES MADE THEREFROM, AND METHODS OF MAKING AND USING SAME

[75] Inventors: Thomas P. Klun, Lakeland Township, Washington County; Louis D. Hibbard, Eagan; Kathryn M. Spurgeon, River Falls; Scott R. Culler, Burnsville, all of Minn.

[73] Assignee: Minnesota Mining and Manufacturing Company, St. Paul, Minn.

[21] Appl. No.: 753,208

[22] Filed: Nov. 21, 1996

Related U.S. Application Data

[63] Continuation of Ser. No. 597,683, Feb. 6, 1996, abandoned, which is a continuation of Ser. No. 444,966, May 19, 1995, abandoned, which is a continuation of Ser. No. 156,803, Nov. 22, 1993, abandoned.

[51] Int. Cl.$^6$ ............................................. C09K 3/14
[52] U.S. Cl. ............................ 51/298; 51/294; 51/295; 522/83
[58] Field of Search ........................ 51/294, 295, 298; 522/83; 430/281; 428/323, 328

[56] References Cited

U.S. PATENT DOCUMENTS

| | | | |
|---|---|---|---|
| 3,688,453 | 9/1972 | Legacy et al. | 51/400 |
| 4,113,721 | 9/1978 | Hauser et al. | 260/178 |
| 4,141,684 | 2/1979 | Kuhn | 8/39 R |
| 4,202,957 | 5/1980 | Bonk et al. | 528/77 |
| 4,279,721 | 7/1981 | Kirchmayr et al. | 204/159.24 |
| 4,284,729 | 8/1981 | Cross et al. | 521/158 |
| 4,478,876 | 10/1984 | Chung | 522/83 |
| 4,559,371 | 12/1985 | Husler et al. | 204/158 R |
| 4,582,862 | 4/1986 | Berner et al. | 522/14 |
| 4,588,419 | 5/1986 | Caul et al. | 51/295 |
| 4,644,703 | 2/1987 | Kaczmarek et al. | 51/401 |
| 4,649,062 | 3/1987 | Kosiorek et al. | 427/54.1 |
| 4,652,274 | 3/1987 | Boettcher et al. | 51/298 |
| 4,707,432 | 11/1987 | Gatechair et al. | 430/281 |
| 4,735,632 | 4/1988 | Oxman et al. | 51/295 |
| 4,751,138 | 6/1988 | Tumey et al. | 51/295 |
| 4,773,920 | 9/1988 | Chasman et al. | 51/295 |
| 4,812,141 | 3/1989 | Baumgartner et al. | 8/506 |
| 4,836,832 | 6/1989 | Tumey et al. | 51/295 |
| 4,900,823 | 2/1990 | Husler et al. | 544/174 |
| 4,903,440 | 2/1990 | Larson et al. | 51/298 |
| 4,927,431 | 5/1990 | Buchanan et al. | 51/298 |
| 4,933,373 | 6/1990 | Moren | 521/99 |
| 4,985,340 | 1/1991 | Palazzotto et al. | 430/270 |
| 4,992,547 | 2/1991 | Berner et al. | 544/162 |
| 4,997,717 | 3/1991 | Rembolu | 478/413 |
| 5,021,480 | 6/1991 | Ravichandran | 524/99 |
| 5,055,113 | 10/1991 | Larson et al. | 51/298 |
| 5,077,402 | 12/1991 | Desobry et al. | 544/87 |
| 5,140,081 | 8/1992 | Seltzer et al. | 526/204 |
| 5,145,885 | 9/1992 | Berner et al. | 522/39 |
| 5,152,917 | 10/1992 | Pieper et al. | 51/295 |
| 5,178,646 | 1/1993 | Barber, Jr. et al. | 51/295 |
| 5,221,296 | 6/1993 | Schwerzel et al. | 51/298 |
| 5,236,472 | 8/1993 | Kirk et al. | 51/295 |
| 5,256,170 | 10/1993 | Harmer et al. | 51/295 |
| 5,342,419 | 8/1994 | Hibbard | 51/308 |
| 5,368,619 | 11/1994 | Culler | 51/308 |
| 5,378,251 | 1/1995 | Culler et al. | 51/295 |
| 5,435,816 | 7/1995 | Spurgeon et al. | 51/295 |
| 5,527,368 | 6/1996 | Supkis et al. | 51/298 |

FOREIGN PATENT DOCUMENTS

| | | |
|---|---|---|
| 287516 A2 | 10/1988 | European Pat. Off. . |
| 413657 A2 | 2/1991 | European Pat. Off. . |
| 0 475 592 | 8/1991 | European Pat. Off. . |
| 446175 A2 | 9/1991 | European Pat. Off. . |
| 485334 A2 | 5/1992 | European Pat. Off. . |
| 495751 | 7/1992 | European Pat. Off.`. |
| 495752 A1 | 7/1992 | European Pat. Off. . |
| 58-171406 | 8/1983 | Japan . |
| 60-152505 | 8/1985 | Japan . |
| 3281615 | 12/1991 | Japan . |
| 4310547 | 2/1992 | Japan . |
| 4168161 | 6/1992 | Japan . |
| 4310545 | 11/1992 | Japan . |
| 5194619 | 3/1993 | Japan . |
| 1298232 | 3/1987 | U.S.S.R. . |
| WO 94/15752 | 7/1994 | WIPO ............ B24D 11/00 |

OTHER PUBLICATIONS

Trade Literature, "Irgacure® 369", published 1993. no month.

"Photoinitiators: Mechanism and Applications", Chang et al., published 1993. no month.

"A Novel Photoinitiator for Radiation Curable Coatings", Chang et al., publication date unknown.

"The Effect of Light Sources and Photoinitiators on Through Cure in Pigmented Systems", Chang et al., publication date unknown.

"Photoinitiators for Free Radical and Cationic Polymerisation", Chemistry & Technology of UV & EB Formulation for Coatings, Inks & Paints, K. Dietliker, vol. III, pp. 115–324 (1991) no month.

Reactint® Urethane Colorants, Feb. 1993, Nov. 1992, Mar. 1992, Apr. 1989.

*Primary Examiner*—Deborah Jones
*Attorney, Agent, or Firm*—Gary L. Griswold; Walter N. Kirn; Paul W. Busse

[57] ABSTRACT

Coatable compositions suitable for use in producing abrasive articles are presented. The inventive coatable compositions comprise a free radically polymerizable composition, abrasive particles, and a photoinitiator system. The photoinitiator system consists essentially of a compound which cleaves via α-cleavage and has a molar absorptivity in dilute methanol solution ranging from about 4 to about 400 liter/mole-cm in at least some portion of the UV/visible spectrum ranging from about 395 and about 500 nanometers. Abrasive articles incorporating cured versions of the compositions are presented, as well as methods of making and using the articles.

40 Claims, 2 Drawing Sheets

COATABLE COMPOSITIONS ABRASIVE ARTICLES MADE THEREFROM, AND METHODS OF MAKING AND USING SAME

This is a continuation of application Ser. No. 08/597,683, filed Feb. 6, 1996 (now abandoned), which is a continuation of application Ser. No. 08/444,966, filed May 19, 1995 (now abandoned), which is a continuation of Ser. No. 08/156,803, filed Nov. 22, 1993 (now abandoned).

BACKGROUND OF THE INVENTION

1. Field of the Invention

This invention relates to coatable compositions useful in making abrasive articles. More specifically, this invention relates to abrasive articles made using coatable compositions which include free radically curable compositions, particularly those including colored abrasive particles and/or colorants.

2. Description of Related Art

Three common abrasive articles are coated abrasives, bonded abrasives, and nonwoven abrasives. A coated abrasive comprises a backing onto which abrasive particles are adhered with a binder, typically a thermoset binder cured in a large festoon oven. The backing may, for example, be selected from paper, cloth, film, vulcanized fiber, and the like, or a combination of one or more of these materials or treated versions thereof. The abrasive particles are typically chosen from flint, garnet, aluminum oxide, alumina zirconia, ceramic aluminum oxide, diamond, silicon carbide (either green or black), cubic boron nitride, and the like. In bonded abrasives, a slurry is prepared comprising a resin and abrasive particles. The slurry is placed in a mold, the resin is cured, typically using heat and pressure, holding the abrasive particles together to form a three-dimensional object. Examples of bonded abrasives include grinding wheels, honing sticks, dresser sticks and sharpening sticks. Nonwoven abrasives comprise an open, lofty, three dimensional web of fibers bound together at points where they contact by a binder, which may or may not include abrasive particles.

The above-mentioned abrasive articles may be produced using addition polymerizable compositions as binder precursors, wherein polymerization may be initiated in a variety of ways, including, for example, thermal decomposition of peroxides, radiation (particle or non-particle), or a combination of the two. The chain carrier in the propagation step may be either ionic or contain a free radical.

Addition polymerizable compositions, particularly free radically polymerizable compositions, are useful in producing abrasive articles. The free radically polymerizable compositions significantly reduce or completely eliminate the need for large festoon thermal curing ovens in the production of coated abrasives. However, the abrasive performance of these articles depends greatly on the curing conditions, such as the wavelength of non-particle radiation, the type and structure of the article being produced, the chemistry of the photoinitiation system used, the color of the abrasive particles, and the like.

For example, there is a wide variety of abrasive particle colors, such that those abrasive particles most suitable for radiation curing may not afford the most efficacious abrasive articles in terms of cut. On the other hand, those abrasive particles having a dark color (such as brown heat-treated aluminum oxide) may not allow radiation to be transmitted to produce the depth of cure necessary to yield efficacious abrasive articles.

Further, if the abrasive articles are produced using a web process, i.e., in large sheet-like structures (often referred to as "webs") which are wound onto a roll, the degree of cure also depends on the exposure time and depth of the coating to be cured.

There is thus a need in the abrasives art for coatable compositions (i.e., compositions having viscosity which allow coating via conventional means, such as knife coaters) which comprise abrasive particles (particularly colored abrasive particles), free radically polymerizable compositions, and photoinitiator systems, which produce efficient abrasive articles at high productions rates.

Caul et al., in U.S. Pat. No. 4,588,419, disclose coated abrasives made from a combination of acrylated epoxy resins and heat curable resins. The resins may include calcium carbonate filler and a suspending agent, the preferred suspending agent apparently being fumed silica. Pieper et al., U.S. Pat. No. 5,152,917, disclose the production of structured abrasives using techniques which are useful in the present invention. Pieper et al. and Caul et al., however, do not disclose use of the photoinitiator systems which are useful in the present invention, or how their use may afford a more efficient abrasive article or higher production rates.

SUMMARY OF THE INVENTION

In accordance with the present invention, novel coatable compositions including a photoinitiator system are presented, and abrasive articles produced utilizing same. Surprisingly, it has been found that the addition of a photoinitiator system, which includes a compound having molar absorptivity within the herein-mentioned range, to conventional free radical polymerizable compositions, allows for faster cure of the coatable compositions (allowing faster web speeds and better depth of cure of the coatable composition). Further, the abrasive products exhibit improved performance over articles made using previously known photoinitiators, as exemplified in the Examples herein below.

Thus, one aspect of the invention is a coatable composition suitable for use in producing abrasive articles, the coatable composition consisting essentially of:

(a) abrasive particles;

(b) a free radically polymerizable composition; and (c) a photoinitiator system, wherein said photoinitiator system comprises a compound which cleaves via α-cleavage, said compound having a molar absorptivity in dilute methanol solution ranging from about 4 to about 400 liter/mole-cm in at least some portion of the UV/visible spectrum ranging from about 395 nanometers to about 500 nanometers.

As used herein the term "about 4 liter/mole-cm", when discussing molar absorptivity, means 4±1; the term "about 395 nanometers", when discussing the UV/visible spectrum, means 395±5 nanometers.

As used herein the term "molar absorptivity in dilute methanol solution" means the absorptivity in an approximately 1.0 to 10 millimolar solution of methanol at ambient temperature (about 20° C.).

Particularly preferred coatable compositions are those wherein the compound of the photoinitiator system consists essentially of an α-amino acetophenone, particularly 2-benzyl-2-N,N-dimethylamino-1-(4-morpholinophenyl)-1-butanone, available under the trade designation "Irgacure 369", from Ciba-Geigy Corp., Ardsley, N.Y.

As used herein the term "coatable composition" when used to described the inventive compositions means a composition consisting essentially of abrasive particles and a photoinitiator system dispersed in a free radically polymerizable composition. The term is meant to include compositions which may be coated by conventional coating equipment, such as knife coaters. The term is also meant to include compositions which may be made coatable, such as with the application of heat and/or shear forces.

"Free radically polymerizable composition" includes monomeric and oligomeric compounds and resins in which polymerization is initiated and propagated by free radicals, and the terms "polymerizable" and "polymerized" resin are meant to include resins produced by both chain growth and crosslinking reactions.

The terms "dispersion" and "dispersed" do not necessarily connote a uniform or homogenous dispersion, but uniform dispersions of both the abrasive particles and photoinitiator system in the free radically polymerizable composition are preferred.

As used herein the term "photoinitiator system consisting essentially of" is meant to exclude those materials which would have a substantially deleterious effect on (or completely terminate) free radical polymerization. The term "photoinitiator system" also excludes ion-generating compounds, however the term "coatable composition consisting essentially of" does not exclude ion-generating compounds, and does not exclude those thermally curable resins, fillers, diluents, and the like, which are compatible with the critical ingredients of the coatable compositions of the invention. In the specific context of this invention, this means that the inventive coatable compositions preferably contain less than 5 weight percent water, more preferably less than 1 weight percent, and most preferably no water.

The term "binder" means a cured composition, whereas "binder precursor" means an uncured composition.

In the context of the present invention the phrase "suitable for use in producing abrasive articles" means that, in the case of coated, bonded, and nonwoven abrasives, the coatable compositions of the invention have rheological properties allowing them to be coated, sprayed, spread or poured onto a backing or into a mold without having to continuously agitate the composition.

One preferred free radically polymerizable composition for use in the invention is that including an acrylated isocyanurate monomer and/or oligomer. As used herein the term "resin" includes monomers and oligomers.

Another aspect of the invention is an abrasive article made using the coatable composition of the present invention, the article comprising a plurality of abrasive particles adhered together (and optionally to a backing) by a binder derived from a free radically polymerizable composition which includes a photoinitiator system, the photoinitiator system comprising a compound having the molar absorptivity previously enumerated. In a further embodiment of this aspect of the invention, the aforesaid binder includes a fist photoinitated free radically polymerized resin comprising R-terminated polymerized units of ethylenically unsaturated compounds, where R is a residue of the aforesaid photoinitiator compound. In an even further embodiment thereto, the binder also includes a second photoinitated free radically polymerized resin comprising an additional R-terminated polymerized units of ethylenically unsaturated compounds, where the additional R is a residue of a second photoinitiator compound selected from among non-α-cleavage photoinitiators; unimolecular α-cleavage photoinitiators having a molar absorptivity in dilute methanol solution less than about 4 liter/mole-cm; and unimolecular α-cleavage photoinitiators having a molar absorptivity in dilute methanol solution greater than about 400 liter/mole-cm.

Another aspect of the invention is a coated abrasive of the type comprising a backing having an abrasive coating thereon, wherein the abrasive coating is derived from the inventive coatable composition. As used herein the term "coated" abrasive means an article comprising an abrasive coating adhered to a backing. Preferred abrasive coatings of the inventive coated abrasives include aluminum oxide abrasive particles, wherein the photoinitiator system comprises from about 0.1 to about 10 weight percent of the abrasive composition, the abrasive particles comprise from about 50 to about 85 weight percent, and the addition polymerizable resin comprises from about 10 to about 45 weight percent, all weight percentages based on total dry weight of said coatable composition.

Another aspect of the invention is a method of making a coated abrasive comprising the steps of:

(a) coating a backing material with the inventive coatable composition; and (b) exposing the coated backing of step (a) to at least some portion of the UV/visible spectrum ranging from about 395 nanometers to about 500 nanometers sufficient to cure the free radically polymerizable resin in the coatable composition.

A variation of this method is a method of making a coated abrasive comprising the steps of:

(a) coating a backing material with a make coating binder precursor;

(b) applying abrasive particles to the make coating precursor;

(c) exposing the make coating precursor to conditions sufficient to at least partially cure the make coating precursor to form a first intermediate article;

(d) applying a size coating precursor over the first intermediate article to form a second intermediate article; and (e) exposing the second intermediate article to conditions sufficient to cure the size coating and optionally more completely cure the make coating precursors to form an abrasive article, wherein at least one of the make and size coating precursors comprises a free radically polymerizable composition and a photoinitiator system, the photoinitiator system consisting essentially of a compound which cleaves via α-cleavage and having the molar absorptivity as above described, and wherein at least one of the exposing steps comprises exposing the article to at least some portion of the UV/visible radiation spectrum.

Yet another aspect of the invention is a method of making an abrasive article comprising the steps of:

1) coating a coatable composition of the invention onto a production tool having a three dimensional pattern;

2) contacting a major surface of a backing having two major surfaces with the coatable composition so that the coatable composition wets at least one major surface of the backing, thus forming a first intermediate article;

3) exposing the coatable composition to a radiation source which emits radiation in at least some portion of the UV/visible spectrum ranging from about 395 nanometers to about 500 nanometers sufficient to at least partially cure the free radically polymerizable resin in the coatable composition to form a second intermediate article; and 4) removing the second intermediate article from the production tool, yielding an abrasive article.

An alternative to this procedure comprises the steps of:
1) contacting one major surface of a backing having two major surfaces with a coatable composition within the invention such that the coatable composition wets the surface to form a first intermediate article;
2) contacting the coatable composition of the first intermediate article to a production tool having a three dimensional pattern;
3) exposing the coatable composition to a radiation source emitting radiation in at least some portion of the UV/visible spectrum ranging from about 395 nanometers to about 500 nanometers sufficient to at least partially cure the free radically polymerizable resin in the coatable composition to form a second intermediate article; and
4) removing the second intermediate article from the production tool, yielding an abrasive article.

Another aspect of the invention is a coated abrasive comprising:
(a) a backing having a front surface and a back surface;
(b) a make coating present on the front surface of the backing;
(c) a plurality of abrasive particles adhered to the backing by the make coating; and
(d) a size coating present over the abrasive particles, wherein at least one of the make and size coatings is derived from a coatable composition comprising an addition polymerizable resin and a photoinitiator system as above described.

In the immediately preceding coated abrasive embodiment, a supersize coating may be applied over a portion of the size coating (or over the entire size coating).

Nonwoven abrasive articles are also within the invention and comprise an open, lofty, three-dimensional network of fibers bound together at points where they contact with a binder, the binder derived from the coatable composition of the invention.

Other advantages and aspects of the invention will be described in the description of preferred embodiments which follows.

DESCRIPTION OF PREFERRED EMBODIMENTS

Figure 3:
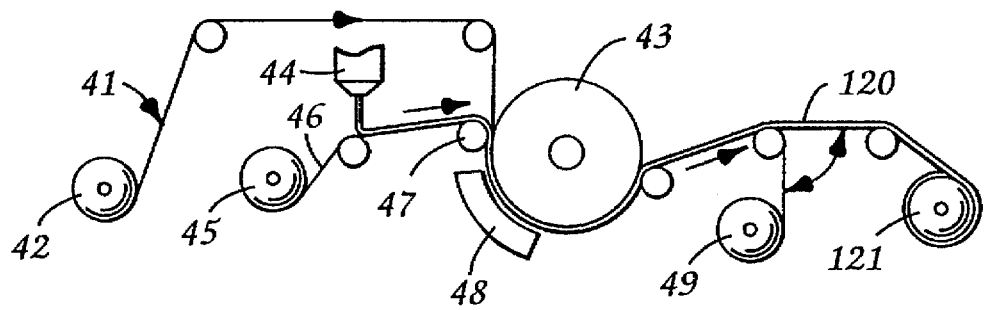
FIG. 3 is a schematic of a process of making the abrasive article of FIG. 2.

This invention pertains to coatable compositions, abrasive articles made employing same, and to methods of making and using abrasive articles, the articles having performance properties equal to or improved over previously known abrasive articles.

In coated abrasives, the term "binder" may refer to any of the coatings. In nonwoven abrasives a binder bonds abrasive particles onto the fibers of a porous, lofty, fibrous web, and the same or a different binder adheres the fibers to themselves at points where they contact.

Photoinitiator Systems

Photoinitiator systems useful in the invention are combined with conventional (i.e., previously known) binder precursors which contain a free radically polymerizable resin and abrasive particles, and optionally previously known photoinitiator systems.

Photoinitiator systems useful in the compositions of the invention are required to comprise a compound which 1) cleaves via α-cleavage, and 2) has a molar absorptivity in dilute methanol solution ranging from about 4 to about 400 liter/mole-cm in at least some portion of the UV/visible spectrum ranging from about 395 nanometers to about 500 nanometers.

The molar absorptivity of a photoinitiator may vary with concentration and type of solvent medium. For the purposes of the present invention, the UV/visible spectral data of photoinitiators having the required molar absorptivity, as well as examples of photoinitiators having molar absorptivity outside of this range but which may comprise a minor portion of a photoinitiator system useful in the invention, are displayed in Tables I to VIII of the Examples section. These tables show the molar absorptivity of various photoinitiators at wavelengths ranging from 370 to 500 nanometers. Since differences in molar absorptivities of photoinitiators at any given wavelength can be observed simply by measuring the spectra in different solvents, a single solvent, methanol, was used in measuring the spectra for all photoinitiators. Also, since one goal was to accurately measure molar absorptivities in the range of 0 to 400 liter/mole-cm, the concentrations of the solutions were about 1.0–10 millimolar to minimize measurement error. For the purpose of the present invention, the term "dilute methanol solution" means a methanol solution of a photoinitiator system in the above specified concentration range. (To gather information on the absorption maxima of the photoinitiators at which the molar absorptivity could easily be 10,000 to 50,000, even less concentrated solutions of methanol would be appropriate.)

The terms "photoinitiator", "α-cleavage photoinitiator", "sensitizer", "bimolecular photoinitiator system", "aromatic ketone/coinitiator system", as well as the names of the various initiator compounds and systems mentioned herein are defined in "Chemistry and Technology of UV and EB Formulation for Coatings, Inks, and Paints", Vol. III, pages 115–324, K. Dietliker, published by SITA Technology Ltd. (1991), incorporated by reference herein. A photoinitiator is simply a chemical capable of generating a free radical upon exposure to radiation. The term "α-cleavage photoinitiation" actually refers to the reaction which produces the free radical. Usually α-cleavage photoinitiators undergo a homolytic cleavage (upon irradiation) at a location between a carbonyl group and a carbon, phosphorous, or sulfur atom positioned "α" to the carbonyl group. A "bimolecular photoinitiator system" is a photoinitiator system (i.e., a photoinitiator component) comprising a compound containing a carbonyl group which reacts with a hydrogen donor (termed herein "coinitiator" to give a product in which the carbonyl group is reduced to an alcohol. An "aromatic ketone/coinitiator system" is one type of bimolecular photoinitiator system wherein the compound containing a carbonyl group is an aromatic ketone. One example of this system is benzophenone derivative/amine systems, which are particularly useful in curing coatable compositions of the invention in the presence of air. Other useful bimolecular photoinitiator systems include 1,2-diketone/coinitiator systems (such as camphorquinone/4-N,N-dimethylaminoethyl benzoate), ketocoumarine/coinitiator systems, and thioxanthone/amine coinitiator systems.

The species which absorbs radiation in the case of bimolecular photoinitiator systems is sometimes termed a sensitizer in this context. However, the word "sensitizer" as used herein refers only to compounds which transfer energy from their excited states to other molecules without undergoing a chemical reaction. Sensitizers generally absorb light at a longer wavelength than the photoinitiator compound, and transfer their energy to the photoinitiator. Sensitizers should be capable of light absorption somewhere within the range of wavelengths between about 300 and about 1000 nanometers, more preferably between about 400 and 700 nanometers, and most preferably from about 395 to about 500 nanometers. Examples of preferred sensitizers are thioxanthone derivatives. The sensitizer typically and preferably comprises no more than about 50 weight percent of the photoinitiator system.

Preferably, coatable compositions in accordance with the invention are those wherein the photoinitiator system consists essentially of an α-amino acetophenone. Examples of preferred α-amino acetophenones include 2-benzyl-2-N,N-dimethylamino-1-(4-morpholinophenyl)-butan-1-one, 1-[4-(2-hydroxyethylthio)phenyl]-2-methyl-2-morpholinopropan-1-one, 1-(4-mercaptophenyl)-2-methyl-2-morpholinopropan-1-one, 1-(4-allylthiophenyl)-2-methyl-2-morpholinopropan-1-one, 1-[4-(2-methoxycarbonylethylthio)-phenyl]-2-methyl-2-morpholinopropan-1-one, 1-[4-(dimethylaminomethylthio)-phenyl]- 2-morpholinopropan-1-one, 2-methyl-1-[4-(methylsulfynl)-phenyl]-2-morpholinopropan-1-one, and 2-methyl-1-[4-(methylthio)-phenyl]-2-piperidinopropan-1-one, and others from columns 7–11 of U.S. Pat. No. 5,145,885, columns 7–11 of which is incorporated herein by reference.

Other preferred coatable compositions in accordance with the invention are those wherein the α-amino acetophenone is 2-methyl-1-(4-[methylthio]phenyl)-2-(4-morpholinyl)-propan-1-one, and the photoinitiator system further consists of a thioxanthone. Preferred thioxanthones include:

2-isopropylthioxanthone, 2-chlorothioxanthone, 2-dodecylthioxanthone, 1-methoxycarbonylthioxanthone, 2-ethoxycarbonylthioxanthone, 3-(2-methoxyethoxycarbonyl)-thioxanthone, 4-butoxycarbonylthioxanthone, 3-butoxycarbonyl-7-methylthioxanthone, 1-cyano-3-chlorothioxanthone, 2-morpholinomethylthioxanthone, and those other xanthones disclosed in column 17 of U.S. Pat. No. 5,145, 885, which column is incorporated herein by reference. Particularly preferred is 2-isopropylthioxanthone. Other preferred thioxanthones include 1-chloro-4-propoxythioxanthone, 2-propoxythioxanthone, and 4-propoxythioxanthone.

Yet other preferred coatable compositions within the invention are those wherein the compound of the photoinitiator system is an acylphosphine oxide, preferably selected from the group consisting of monoacylphosphine oxides and diacylphosphine oxides. Acylphosphine oxides useful in the invention include dibenzyl-(2,4,6-trimethylbenzoyl)-phosphine oxide, bis (2-phenylethyl)-(2,6-dichlorobenzoyl)-phosphine oxide, bis(2-phenylpropyl)-(2,6-dimethoxybenzoyl)-phosphine oxide, bis(2-phenylpropyl)-(2,4,6-trimethylbenzoyl)-phosphine oxide, dibutyl-(2-methyl-2-phenylbutyryl)-phosphine oxide, 6-(2,6-dichlorobenzoyl)-6-phosphabicyclo[2.1.1] hexan-6-oxide, bis(2,4,6-trimethylbenzoyl)-2-phenylpropylphosphine oxide, bis(methylthio-2-phenylbutyryl)-cyclohexylphosphine oxide, diphenyl 2,4,6-trimethyl benzoylphosphine oxide, and others from European Patent Application no. 0 413 657 A2, published Feb. 20, 1991, incorporated by reference herein.

A particularly preferred coatable composition in accordance with the invention is that wherein the first compound is diphenyl 2,4,6-trimethyl benzoylphosphine oxide.

Suitable sensitizers include compounds such as ketones, coumarin dyes (e.g., keto coumarins), xanthene dyes, acridine dyes, thiazole dyes, and others listed in column 4, line 30 through column 5, line 11 of U.S. Pat. No. 4,735,632, which lines are incorporated herein by reference.

The preferred 1,2-diketone is camphorquinone.

The coatable compositions of the invention may comprise a sensitizer in combination with bimolecular photoinitiators. For instance, α-benzyl-2-N,N-dimethylamino-1-(4-morpholinophenyl)-butan-1-one may be sensitized with isopropylthioxanthone, and the composition may include a benzophenone/amine system or a thioxanthone/amine system.

It is also considered within the invention to include cyclopentadienyl iron (II) arene+XF6- salts in the sulfonium salts or iodonium salts, if a part of the resin system can be cationically cured or halomethyl-s-triazines which produce chloride radicals. Such initiators and the like are mentioned in Dietliker, pages 329–478, incorporated herein by reference, which may also be used in conjunction with sensitizers.

The photoinitiator systems useful in the invention may also comprise (in addition to α-cleavage compounds having molar absorptivity in dilute methanol solution ranging from about 4 to about 400 liter/mole-cm in at least some portion of the UV/visible spectrum ranging from about 395 nanometers to about 500 nanometers) ternary photoinitiators as disclosed in Oxman et al., U.S. Pat. No. 4,735,632, incorporated by reference herein, in which the photoinitiator system comprises photochemically effective amounts of (i) diaryliodonium salt, (ii) sensitizer capable of absorbing light somewhere within the range of 300 to 1000 nanometers and capable of sensitizing 2-methyl-4,6-bis(trichloromethyl)-s-triazine, and (iii) electron donor compound which is different from the sensitizer and wherein zero<$E_{ox}$(donor)≧$E_{ox}$(p-dimethoxybenzene).

The photoinitiator systems useful in the invention may also comprise (in addition to α-cleavage compounds having molar absorptivity in dilute methanol solution ranging from about 4 to about 400 liter/mole-cm in at least some portion of the UV/visible spectrum ranging from about 395 nanometers to about 500 nanometers) a bimolecular photoinitiator component, or a photoinitiator compound selected from the group consisting of:

a) non-α-cleavage photoinitiators;

b) unimolecular α-cleavage photoinitiators having a molar absorptivity in dilute methanol solution less than about 4 liter/mole-cm; and c) unimolecular α-cleavage photoinitiators having a molar absorptivity in dilute methanol solution greater than about 400 liter/mole-cm.

Coatable compositions in accordance with the invention preferably consist essentially of from about 0.1 to about 10 weight percent photoinitiator system (more preferably from about 0.1 to about 2 weight percent), from about 50 to about 85 weight percent abrasive particles, and from about 10 to about 45 weight percent free radical polymerizable resin, all weight percentages based on total weight of the coatable composition.

Other photoinitiators not falling within the molar absorptivity in dilute methanol solution ranging from about 4 to about 400 liter/mole-cm in at least some portion of the UV/visible spectrum ranging from about 395 nanometers to about 500 nanometers may be combined with the coatable compositions of the invention, depending on the coatable composition chemistry. Examples of useful conventional initiators that generate a free radical upon exposure to radiation or heat include organic peroxides, azo compounds, quinones, benzophenones, nitroso compounds, acryl halides, hydrozones, mercapto compounds, pyrylium compounds, triacrylimidazoles, bisimidazoles, chloroalkyltriazines, benzoin ethers, benzil ketals, acetophenone derivatives not having molar absorptivity in dilute methanol solution ranging from about 4 to about 400 liter/mole-cm in at least some portion of the UV/visible spectrum ranging from about 395 nanometers to about 500 nanometers, and mixtures thereof. Examples of conventional photoinitiators that when exposed to visible radiation generate a free radical are described in U.S. Pat. No. 4,735,632, incorporated herein by reference.

Cationic photoinitiators which generate an acid source to initiate polymerization of addition polymerizable resins may also be employed in combination with the coatable compositions of the invention. Cationic photoinitiators can include a salt having an onium cation and a halogen containing complex anion of a metal or metalloid. Other useful cationic photoinitiators include salts of organometallic complex cations and halogen-containing complex anions of a metal or metalloid, which are further described in U.S. Pat. No. 4,751,138, incorporated herein by reference. Still other useful cationic photoinitiators are organometallic salts and onium salts, described in U.S. Pat. No. 4,985,340, and European Patent Applications 306,161 and 306,162, both published Mar. 8, 1989, all incorporated herein by reference. Yet other useful cationic photoinitiators include ionic salts of an organometallic complex in which the metal is selected from the elements of Periodic Group IVB, VB, VIB, VIIB and VIIIB, such salts being described in European Patent Application 109,581 (published May 30, 1984), incorporated herein by reference.

Polymerizable Resins

Polymerizable resins useful in the invention may be selected from those commonly used in the abrasive art. The resin should be selected such that it will allow production of an abrasive article having desired properties for the intended use of the abrasive article. Desired properties may include, for example, toughness, heat resistance, good adhesion of binder to backing, high cut, and the like. In some instances it is also desired that the workpiece have a smooth surface finish.

Addition polymerizable resins useful in the practice of the invention are those resins capable of being initiated by exposure to radiation, a photoinitiator, a thermal initiator, or combination of these. Suitable radiation sources include those which produce ultraviolet radiation, infrared radiation, and visible light.

Addition polymerizable resins polymerize via a free radical mechanism or an ionic mechanism. Free radicals or ions may be produced by addition of photoinitiators or thermal initiators to the resins. When a photoinitiator alone is used, or when it is exposed to non-particle radiation such as ultraviolet radiation or visible light, the photoinitiator generates free radicals. The free radicals initiate the polymerization of the resin.

Examples of typical and preferred addition polymerizable resins for use in the binder precursors of the invention include: polymers, oligomers, and monomers which are ethylenically unsaturated, for example acrylated resins such as isocyanurate resins having at least one pendant acrylate group (the triacrylate of tris(hydroxyethyl) isocyanurate would be one example), acrylated urethane resins, acrylated epoxy resins, and isocyanate derivatives having at least one pendant acrylate group. It is to be understood that mixtures of the above resins could also be employed. The term "acrylated" is meant to include monoacrylated, monomethacrylated, multi-acrylated, and multi-methacrylated monomers, oligomers and polymers. Low molecular weight acrylates are one preferred type of reactive diluent. Acrylate reactive diluents preferred for use in the invention typically have a molecular weight ranging from about 100 to about 500, and include ethylene glycol diacrylate, ethylene glycol dimethacrylate, tetrahydrofurfuryl acrylate, pentaerythritol triacrylate, hexanediol diacrylate, triethylene glycol diacrylate, trimethylolpropane triacrylate, glycerol triacrylate, pentaerthyitol triacrylate, pentaerythritol trimethacrylate, pentaerythritol tetraacrylate and pentaerythritol tetramethacrylate. Methyl methacrylate and ethyl methacrylate may also be used. The inventive compositions may also contain addition polymerizable monomers, such as styrene, divinylbenzene, vinyl toluene, acrylamides, and the like.

It is noteworthy to mention that monomers which are solids at room temperature may be used if combined with a suitable low molecular weight diluent compound. This is the case with the triacrylate of tris(hydroxyethyl)isocyanurate ("TATHEIC"), one particularly preferred resin, which is a solid at room temperature. When this monomer is used, the "polymerizable resin" for which viscosity reduction is attained includes a compound, which may or may not be reactive with the monomer, but preferably is reactive with the monomer (and is therefore considered another monomer). One preferred low molecular weight diluent for room temperature solid acrylated monomers is trimethylol propane triacrylate ("TMPTA"); however, diluents such as these are more correctly referred to as reactive diluents when the polymerizable resin is already liquid at room temperature (i.e., about 25° C.). When TATHEIC is used, the combination of TATHEIC/TMPTA is considered as the polymerizable resin in the slurries and dispersions of the invention. The weight ratio of TATHEIC/TMPTA may range from about 1:3 to about 3:1, more preferably from about 1:2.5 to about 2.5:1, most preferably about 1:2.33.

Diluents may also be used in the slurries and dispersions of the invention. As used herein the term "diluent" connotes a low molecular weight (less than 500) organic material that may or may not decrease the viscosity of the binder precursor to which they are added. Diluents may be reactive with the resin or inert.

Acrylated isocyanurate oligomer resins are the presently preferred addition polymerizable resins. Isocyanurate resins useful in the invention include those having at least one pendant acrylate group, which are described in U.S. Pat. No. 4,652,274, incorporated herein by reference. As mentioned previously, one particularly preferred isocyanurate material is TATHEIC combined with TMPTA.

Acrylated urethane oligomer resins are preferably acrylate esters of hydroxy-terminated, isocyanate-extended polyester or polyether polyols esterified with low molecular weight (less than about 500) acrylates (such as 2-hydroxyethyl acrylate). The number average molecular weight of preferred acrylated urethane oligomer resins ranges from about 300 to about 10,000, more preferably from about 400 to about 7,000. Examples of commercially available acrylated urethane oligomer resins are those marketed under the trade designations "UVITHANE 782" (available from Morton Thiokol Chemical) and "CMD 6600", "CMD 8400", and "CMD 8805" (available from Radcure Specialties).

Acrylated epoxy oligomer resins are acrylate esters of epoxy resins, such as the diacrylate esters of bisphenol-A epoxy resin. Examples of commercially available acrylated epoxy oligomer resins include those known under the trade designations "CMD 3500", "CMD 3600", and "CMD 3700", also available from Radcure Specialties.

Optionally, non-radiation curable resins, such as thermally curable resins selected from the group consisting of phenolic resins, urea-aldehyde resins, epoxy resins, urethane resins, melamine resins and combinations thereof, may be employed in the coatable compositions of the invention, as long as they are not present in concentrations which might be deleterious to the photoinitiator system.

Examples of useful optional commercially available phenolic resins include those known by the trade designations "Durez" and "Varcum" from Occidental Chemicals Corp.; "Resinox" from Monsanto; and "Arofene" and "Arotap" from Ashland Chemical Co.

Urethanes useful in the invention include those disclosed in U.S. Pat. No. 4,933,373, incorporated by reference herein, which are the reaction product of short-chain, active hydrogen functional monomer, such as trimethylolpropane monoallyl ether, ethanol amine, and the like; long-chain, active hydrogen functional diene prepolymer, such as the hydroxy-terminated polybutadiene commercially available from Atochem Inc. under the trade designation "Polybd R-45HT"; a polyisocyanate, and a crosslinking initiator. Suitable crosslinking initiators are organic peroxides, such as benzoyl peroxide, and the like. Urethane catalysts may be used, although not essential, such as those mentioned in U.S. Pat. No. 4,202,957.

Epoxy resins have an oxirane (epoxide) ring and are polymerized by ring opening. Epoxy resins which lack ethylenically unsaturated bonds require the use of photoinitiators. These resins can vary greatly in the nature of their backbones and substituent groups. For example, the backbone may be of any type normally associated with epoxy resins and substituent groups thereon can be any group free of an active hydrogen atom that is reactive (or capable of being made reactive) with an oxirane ring at room temperature. Representative examples of acceptable substituent groups include halogens, ester groups, ether groups, sulfonate groups, siloxane groups, nitro groups and phosphate groups. Examples of preferred epoxy resins lacking ethylenically unsaturated groups include 2,2-bis[4-(2,3-epoxypropoxy)phenyl]propane (diglycidyl ether of bisphenol A) and commercially available materials under the trade designation "Epon 828", "Epon 1004" and "Epon 1001F" available from Shell Chemical Co., "DER-331", "DER-332" and "DER-334" available from the Dow Chemical Co. Other suitable epoxy resins lacking ethylenically unsaturated groups include glycidyl ethers of phenol formaldehyde novolak resins (e.g., "DEN-431" and "DEN-438" available from the Dow Chemical Co.).

Other useful reactive diluents include monoallyl, polyallyl, and polymethallyl esters and amides of carboxylic acids (such as diallyl phthalate, diallyl adipate, and N,N-diallyladipamide); tris(2-acryloyloxyethyl)isocyanurate, 1,3,5-tri(2-methacryloxyethyl)-s-triazine, acrylamide, methylacrylamide, N-methylacrylamide, N,N-dimethylacrylamide, N-vinylpyrrolidone, and N-vinylpiperidone.

It should be understood that polymerizable resins which are not photoinitiated by the photoinitiator systems described herein may be used in articles of the invention, for example, as size or make coatings in coated and nonwoven abrasive articles.

Curing Conditions

Detailed examples of curing conditions for the coatable compositions of the invention are given in the Examples section. It is preferred for the purposes of this invention that the radiation used include at least some portion of the "UV/visible" spectrum ranging from about 395 nanometers to about 500 nanometers. UV (ultraviolet) radiation refers to electromagnetic radiation having a wavelength within the range of about 200 to about 400 nanometers, preferably within the range of about 250 to 400 nanometers. Visible radiation refers to electromagnetic radiation having a wavelength within the range of about 400 to about 800 nanometers, and preferably in the range of about 400 to about 550 nanometers.

Free radically and other addition polymerizable resins require an initiator such as a photoinitiator and/or radiation energy. Preferably, photoinitiators and radiation energy are used simultaneously.

As thermally curable resins, such as phenolic resins and urea-formaldehyde resins, as well as non-free-radically polymerizable addition resins, may be present in the coatable compositions of the invention, and since addition polymerization rates generally increase with temperature, the coatable compositions may be simultaneously and/or sequentially exposed to radiation energy and thermal energy. For thermal energy, the temperature typically and preferably ranges from about 50° C. to about 250° C., for residence times ranging from about 15 minutes to about 16 hours (longer residence times requiring lower temperatures). For free radical addition polymerization in the absence of heating while exposing to solely UV or visible radiation, in order to more completely polymerize all ethylenically unsaturated monomer, the UV or visible energy level should be at least about 100 milliJoules/cm$^2$, more preferably ranging from about 100 to about 700 milliJoules/cm$^2$, particularly preferably from about 400 to about 600 milliJoules/cm$^2$. The total amount of energy required is primarily dependent upon the resinous adhesive chemistry and secondarily on the thickness and optical density of the binder precursor.

Lapping Abrasive Articles and Methods of Production

An essential step to make inventive abrasive articles using the coatable compositions of the invention is to prepare the coatable composition, also referred to herein as a "slurry". The slurry is made by combining together by any suitable mixing technique the free radically polymerizable resin, the abrasive particles, the photoinitiator system and the optional additives, including any diluents. Examples of mixing techniques include low shear and high shear mixing, with high shear mixing being preferred. Ultrasonic energy may also be utilized in combination with the mixing step to lower the abrasive slurry viscosity. Typically, the abrasive particles and any grinding aid used are gradually added into the binder precursor. The amount of air bubbles in the slurry can be minimized by pulling a vacuum during the mixing and/or coating steps (or between the mixing and coating steps). In some instances it is preferred to heat, generally in the range of 30° to 70° C., the slurry to lower the viscosity. It is important the slurry have rheological properties that allow the slurry to coat well and in which the abrasive particles and other optional particulate matter, such as grinding aid particles, do not settle out of the slurry.

The slurry is coated on at least the front surface of a backing. This coating can be accomplished by any conventional technique such as roll coating, gravure coating, knife coating, spray coating, transfer coating, vacuum die coating, die coating and the like.

After the slurry is coated onto the backing, the slurry is exposed to a radiation source producing radiation in at least some portion of the "UV/visible" spectrum ranging from about 395 nanometers to about 500 nanometers, and other optional energy sources, depending on the resins used, to initiate polymerization, cure the binder precursors and form an abrasive composite. The resulting abrasive article is generally ready for use. However, in some instances other processes may still be necessary such as humidification or flexing. The abrasive article can be converted into any desired form such as a cone, endless belt, sheet, disc, and the like, before the abrasive article is used.

Figure 1:
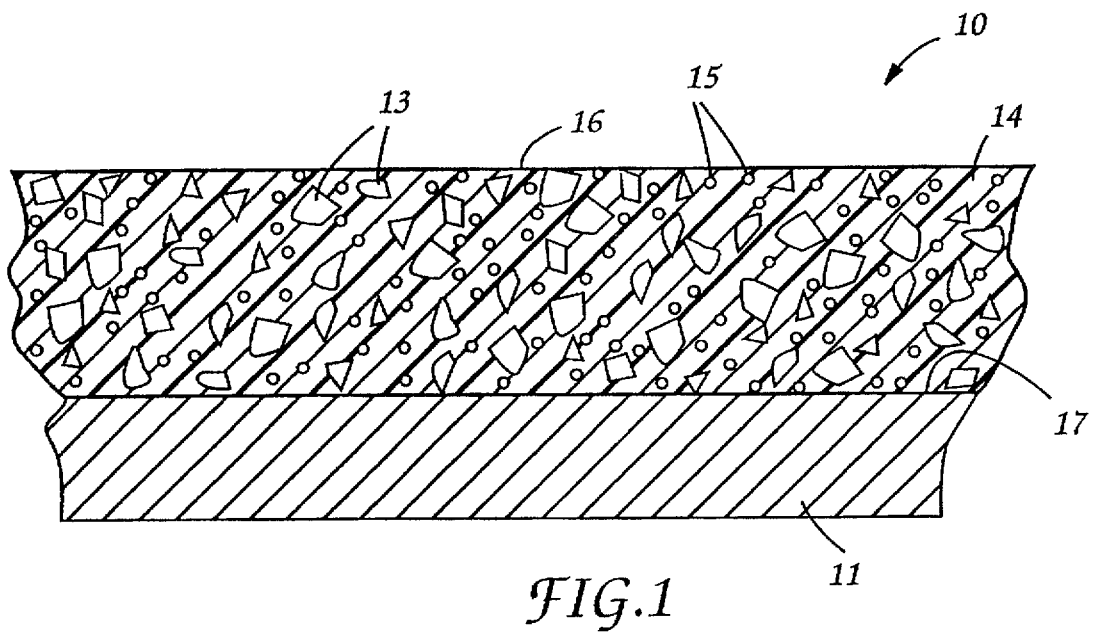
FIG. 1 is a section view, enlarged, of an abrasive article embodiment of this invention.
Figure 2:
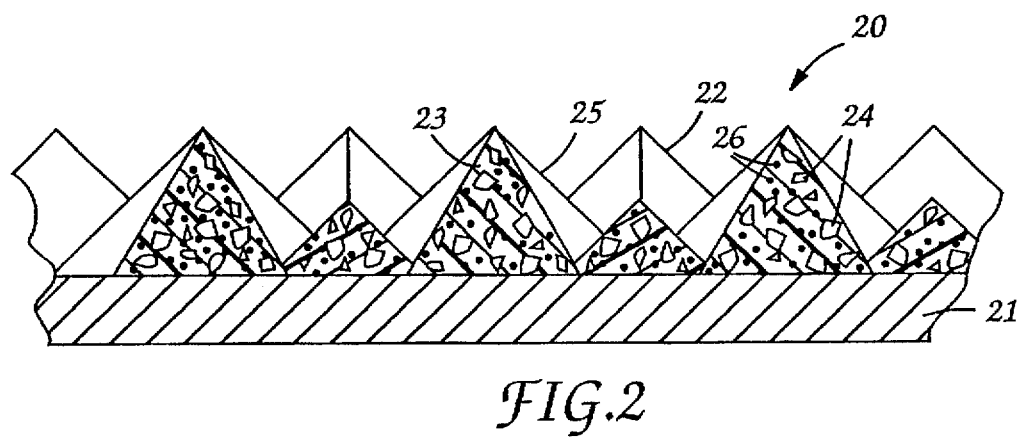
FIG. 2 is a section view, enlarged, representing another abrasive article embodiment of this invention.

Lapping abrasives, examples of which are illustrated in FIGS. 1 and 2, are a type of coated abrasive.

Referring to the drawing figures, FIG. 1 is an illustration (enlarged) of a lapping abrasive article 10 within the invention having a backing 11 having an abrasive coating 16 bonded to at least the front surface 17 of the backing. The abrasive coating 16 comprises a homogeneous mixture of a plurality of abrasive particles 13, a binder 14 and optionally a grinding aid 15. The binder 14 serves also to bond the abrasive coating 16 to the front surface 17 of the backing 11. The abrasive particles are essentially uniformly dispersed throughout the binder and grinding aid mixture.

The lapping abrasive article embodiment illustrated in FIG. 1 may be made by coating a coatable composition within the invention onto the backing by any suitable technique previously mentioned, it being understood that a more rough or varied surface may be produced. The composition is then exposed to a radiation source producing radiation in at least some portion of the "UV/visible" spectrum ranging from about 395 nanometers to about 500 nanometers, and other optional energy sources, depending on the resins used, to cure the binder precursors and form an abrasive composite. Alternatively, the coatable composition may be applied to the backing through a screen to create a patterned abrasive surface.

In some instances it is preferred that the abrasive coating be present as precisely shaped abrasive composites, such as illustrated in FIG. 2. In order to make this type of abrasive article, a production tool is generally required.

The production tool contains a plurality of cavities. These cavities are essentially the inverse shape of the abrasive composite and are responsible for generating the shape of the abrasive composites. The dimensions of the cavities are selected to provide the desired shape and dimensions of the abrasive composites. If the shape or dimensions of the cavities are not properly fabricated, the resulting production tool will not provide the desired dimensions for the abrasive composites.

The cavities can be present in a dot like pattern with spaces between adjacent cavities or the cavities can butt up against one another. It is preferred that the cavities butt up against one another. Additionally, the shape of the cavities is selected such that the cross-sectional area of the abrasive composite decreases away from the backing.

The production tool can be a belt, a sheet, a continuous sheet or web, a coating roll such as a rotogravure roll, a sleeve mounted on a coating roll, or die. The production tool can be composed of metal, (e.g., nickel), metal alloys, or plastic. The metal production tool can be fabricated by any conventional technique such as engraving, hobbing, electroforming, diamond turning, and the like. One preferred technique for a metal production tool is diamond turning.

A thermoplastic production tool in sheet form can be replicated off a metal master tool. The master tool will have the inverse pattern desired for the production tool. The master tool can be made in the same manner as the metal production tool. The master tool is preferably made out of metal, e.g., copper which is electroplated onto a plastic master, the latter produced by diamond turning. The thermoplastic sheet material can be heated and optionally along with the master tool such that the thermoplastic material is embossed with the master tool pattern by pressing the two together. The thermoplastic material can also be extruded or cast onto the master tool. In both cases, the thermoplastic material is cooled below its melt flow temperature to produce the production tool. Examples of preferred thermoplastic production tool materials include polyester, polycarbonate, polyvinyl chloride, polypropylene, polyethylene and combinations thereof. If a thermoplastic production tool is utilized, then care must be taken not to generate excessive heat that may distort the tool.

The production tool may also contain a release coating to permit easier release of the abrasive article from the production tool. Examples of such release coatings for metal production tools include hard carbide, nitrides or borides coatings. Examples of release coatings for thermoplastics include silicones and fluorochemicals, either grafted onto, or impregnated into the thermoplastic, or overlayed onto the thermoplastic.

Referring specifically to FIG. 2, there is illustrated, in cross section, enlarged, an abrasive article embodiment 20 comprising a backing 21 onto which a plurality of precisely shaped abrasive composites 22 are separated by boundary 25. The boundary or boundaries associated with the composite shape result in one abrasive composite being separated to some degree from another adjacent abrasive composite. To form an individual abrasive composite, a portion of the boundaries forming the shape of the abrasive composite must be separated from one another. Note that in the article illustrated in FIG. 2, the base or a portion of the abrasive composite closest to the backing can abut with its neighboring abrasive composite. (Note that "neighboring" does not necessarily mean "adjacent".) Abrasive composites 22 comprise a plurality of abrasive particles 24 that are dispersed in a binder 23 optionally containing grinding aid particles 26. It is also within the scope of this invention to have a combination of abrasive composites bonded to a backing in which some of the abrasive composites abut, while other abrasive composites have open spaces between them.

One preferred method of making a lapping coated abrasive such as illustrated in FIG. 2 is to first coat a coatable composition (sometimes referred to herein as a slurry) within the invention onto at least one side of a backing, applied using one of the previously mentioned suitable techniques. One preferred backing 21 is a polymeric film, such as polyester film that contains an ethylene acrylic acid copolymer primer. Second, the slurry-coated backing is contacted with the outer surface of a patterned production tool. The slurry wets the patterned surface to form an intermediate article. Third, the slurry is exposed to radiation in at least some portion of the "UV/visible" spectrum ranging from about 395 nanometers to about 500 nanometers, and other optional energy sources, as previously described which at least partially cures or gels the resin in the slurry before the intermediate article is removed from the outer surface of the production tool. Fourth, the intermediate article is removed from the production tool. The four steps are preferably carried out continuously.

Figure 4:
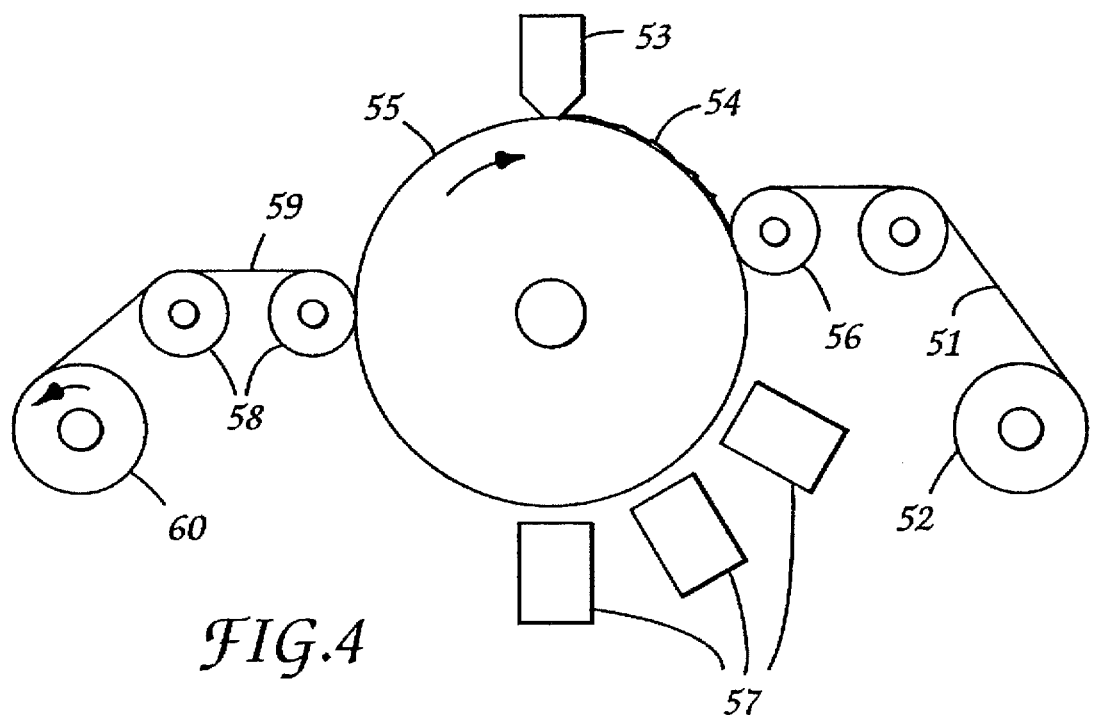
FIG. 4 is a schematic of another process of making the abrasive article of FIG. 2.

Alternatively, the slurry may be first applied to the production tool in the methods illustrated in FIGS. 3 and 4. In FIG. 3, backing 41 leaves an unwind station 42 and at the same time the production tool 46 leaves an unwind station 45. Production tool 46 is coated with slurry by means of coating station 44. It is possible to heat the slurry and/or subject the slurry to ultrasonics prior to coating to lower the viscosity. The coating station can be any conventional coating means such as knife coater, curtain coater, die coater, drop die coater, or vacuum die coater. During coating the formation of air bubbles should be minimized. The preferred coating technique is a vacuum fluid bearing die, such as disclosed in U.S. Pat. Nos. 3,594,865, 4,959,265, and 5,077,870, all incorporated herein by reference. After the production tool is coated, the backing and the slurry are brought into contact by any means such that the slurry wets the front surface of the backing. In FIG. 3, the slurry is brought into contact with a "front" surface the backing by means of a contact nip roll 47. Contact nip roll 47 forces the resulting construction against support drum 43. A source of energy 48 providing radiation at least some portion of the "UV/visible" spectrum ranging from about 395 nanometers to about 500 nanometers, and other optional energy sources, transmits a sufficient amount of energy into the slurry to at least partially cure the binder precursor. The term "partial cure" means that the binder precursor is polymerized to such a state that the cured slurry releases from the production tool. The binder precursor can be more completely cured, once it is removed from the production tool, by an appropriate energy source. Following this, the production tool is rewound on mandrel 49 so that the production tool can be reused again. Additionally, abrasive article 120 is wound on mandrel 121. If the binder precursor is partially cured, the binder precursor can then be more fully cured by exposure to an energy source, preferably a combination of UV/visible radiation and thermal energy.

Alternatively the inventive coatable compositions can be coated onto the backing and not into the cavities of the production tool. The slurry coated backing is then brought into contact with the production tool such that the slurry flows into the cavities of the production tool. The remaining steps to make the abrasive article are the same as detailed above.

Another method is illustrated in FIG. 4. Backing 51 leaves an unwind station 52 and the slurry 54 is coated into the cavities of the production tool 55 by means of the coating station 53. The slurry can be coated onto the tool by any one of many techniques previously mentioned. Again, it is possible to heat the slurry and/or subject the slurry to ultrasonics prior to coating to lower the viscosity. During coating the formation of air bubbles should be minimized. Then, the backing and the production tool containing the abrasive slurry are brought into contact by a nip roll 56 such that the slurry wets the front surface of the backing. Next, the binder precursor in the slurry is at least partially cured by exposure to an energy source 57 providing radiation in at least some portion of the UV/visible spectrum ranging from about 395 nanometers to about 500 nanometers, and other optional energy sources. After this at least partial cure, the slurry is converted to an abrasive composite 59 that is bonded or adhered to the backing. The resulting abrasive article is removed from the production tool by means of nip rolls 58 and wound onto a rewind station 60. In this method the preferred backing is polyester film.

Regarding this latter method, the slurry may alternatively be coated directly onto the front surface of the backing. The slurry coated backing is then brought into contact with the production tool such that the slurry wets into the cavities of the production tool. The remaining steps to make the abrasive article are the same as detailed above.

It is preferred that the free radically polymerizable resin be cured by radiation energy in at least some portion of the UV/visible spectrum ranging from about 395 nanometers to about 500 nanometers. The radiation energy can be transmitted through the production tool so long as the production tool does not appreciably absorb the radiation energy. Additionally, the radiation energy source should not appreciably degrade the production tool.

In each of the methods wherein a patterned tool is coated with a slurry, it is most advantageous if the slurry has a viscosity that will allow the slurry to fill the depressions or cavities in the patterned surface.

Because the pattern of the production tool imparts a pattern to the abrasive articles of the invention, these methods are particularly useful in making "structured" abrasive articles. A structured abrasive article is an abrasive article wherein composites, comprising abrasive particles distributed in a binder, have a precise shape.

In some instances the boundaries forming the shape are planar. For shapes that have planes, there are at least three planes. The number of planes for a given shape can vary depending upon the desired geometry, for instance the number of planes can range from three to over 20. Generally, there are between three to ten planes, preferably between three to six planes. These planes intersect to form the desired shape and the angles at which these planes intersect will determine the shape dimensions.

The abrasive composite shape can be any shape, but it is preferably a geometric shape such as a rectangle, cone, semicircle, circle, triangle, square, hexagon, pyramid, octagon and the like. The preferred shapes are pyramids and truncated pyramids, the bases being either three or four sided. It is also preferred that the abrasive composite cross sectional surface area decreases away from the backing. This variable surface area results in a non-uniform pressure as the abrasive composite wears during use. Additionally, during manufacture of the abrasive article, this variable surface area results in easier release of the abrasive composite from the production tool. In general there are at least 5 individual abrasive composites per square cm. In some instances, there may be at least 500 individual abrasive composites/square cm.

Additional steps to make abrasive articles according to these methods are further described in U.S. Patent No. 5,152,917 and U.S. Ser. No. 08/175,694 (Spurgeon et al.), filed Dec. 30, 1993, now allowed, both incorporated herein by reference. Randomly shaped abrasives composites may be made by the tooling and procedures described in copending Ser. No. 08/120,300, filed Sep. 13, 1993, incorporated herein by reference. In this aspect of the invention, at least 10%, preferably at least 30%, more preferably at least 50% and most preferably at least 60% of the abrasive composites have an adjacent abrasive composite that has a different dimension. These different dimensions can pertain to the abrasive composite shape, angle between planar boundaries or dimensions of the abrasive composite. The result of these different dimensions for neighboring abrasive composites results in an abrasive article that produces a relatively finer surface finish on the workpiece being abraded or refined.

Method of Making Other Inventive Abrasive Articles

The present invention also relates to coated abrasive articles and methods of making same manufactured using the coatable compositions of the invention, either with or devoid of abrasive particles.

In one method in accordance with the invention employing a composition devoid of abrasive particles, a backing may be saturated with a saturant coating precursor by any conventional technique such as dip coating or roll coating, after which the saturant coating precursor is partially cured ("precured").

After the saturant coating precursor is partially cured, a coatable composition within the invention may be applied to either the "back" side of the backing (side of the backing not having abrasive particles adhered thereto) to form a backside coating, or to the "front" side of the backing (side of the backing having abrasive particles adhered thereto) to form a presize coating. These coatings may be applied by any one of a number of conventional technique such as roll coating, die coating or knife coating. The back and/or front-coated backing is then exposed to at least some portion of the UV/visible radiation spectrum, as above described, and optionally other energy sources, to at least partially cure or gel the polymerizable resins in the presize and back size coatings.

Alternatively, a make coating precursor may be applied to a backing, followed by projection of abrasives particles onto the make coating precursor by any one of a number of means, such as electrostatic projection, drop coating, and the like. The make coating precursor is then exposed to conditions which partially cure or solidify the make coating precursor so that a size coating precursor may be applied.

For each of the two previous embodiments, a size coating precursor is then applied over the abrasive particles by any of the above-mentioned conventional techniques, and subjected to conditions to effect a partial or full cure. Also, one or more supersize coating precursors may be applied over the size coating by any conventional technique. Each of the coatings may be fully cured, partially cured or dried after it is applied. After the last coating precursor is applied, and if necessary, any remaining partially cured or dried coatings are fully cured.

In these methods, the make coating precursor, size coating precursor, and supersize precursor compositions may comprise binder precursor materials that are commonly utilized in the coated abrasive art (for example resole phenolic resins), or may comprise a composition (including a photoinitiator system comprising an α-cleavage compound having molar absorptivity in dilute methanol solution ranging from about 4 to about 400 liter/mole-cm in at least some portion of the UV/visible spectrum ranging from about 395 nanometers to about 500 nanometers) devoid of abrasive particles. If such a composition is employed in any of the coatings, the energy source must be capable of emitting UV/visible radiation as previously defined.

Backing Materials for Coated Abrasives

The backing can be any number of various materials conventionally used as backings in the manufacture of coated abrasives, such as paper, cloth, film, vulcanized fiber, woven and nonwoven materials, and the like, or a combination of two or more of these materials or treated versions thereof. The choice of backing material will depend on the intended application of the abrasive article. The strength of the backing should be sufficient to resist tearing or other damage in use, and the thickness and smoothness of the backing should allow achievement of the product thickness and smoothness desired for the intended application. The adhesion of the inventive coatable composition or other binder to the backing should also be sufficient to prevent significant shelling of individual abrasive particles or the abrasive coating during normal use. In some applications it is also preferable that the backing be waterproof. The thickness of the backing should be sufficient to provide the strength desired for the intended application; nevertheless, it should not be so thick as to affect the desired flexibility in the coated abrasive product. For lapping coated abrasives, one preferred backing is polymeric film, such as polyester film, and that the film be primed with a material, such as ethylene acrylic acid copolymer, to promote adhesion of the inventive slurry or dispersion and resulting abrasive composite to the film. It may be preferable to utilize a backing transparent to UV/visible radiation, so that coated abrasive articles of the invention may be made in accordance with the teachings of assignee's U.S. Ser. No. 08/175,694, filed Dec. 30, 1993 (Spurgeon et al.) now allowed.

In the case of a woven backing, it is sometimes preferable to fill the interstices of the backing with at least one coating before the application of an inventive coatable composition. Coatings used for this purpose are called saturant, back or presize coatings, as previously described, depending on how and to what surface of the backing the coating is applied.

The backing may comprise a laminate of backings made by laminating two or more plies of either similar or dissimilar backing materials. For example, the backing can be laminated to a stiffer, more rigid substrate, such as a metal plate, to produce a coated abrasive article having an abrasive coating supported on a rigid substrate.

The surface of the backing not containing the abrasive coating may also contain a pressure-sensitive adhesive or one member of a hook and loop type attachment system so that the abrasive article can be secured to a back-up pad. Examples of pressure-sensitive adhesives suitable for this purpose include rubber-based adhesives, acrylate-based adhesives, and silicone-based adhesives.

Abrasive Particles

Individual abrasive particles may be selected from those commonly used in the abrasive art, however, the abrasive particles (size and composition) will be chosen with the application of the abrasive article in mind. In choosing an appropriate abrasive particle, characteristics such as light absorption, hardness, compatibility with the intended workpiece, particle size, reactivity with the workpiece, as well as heat conductivity may be considered. A key aspect of the present invention is that abrasive particles which were previously thought to be too dark in color to be useful in addition polymerizable binder systems may now be used, and at quite substantial weight percentages. This is quite important as the darker minerals, such as brown heat-treated aluminum oxide, typically achieve higher cut than white aluminum oxide of the same grade. (Black silicon carbide may be used in the compositions of the invention, but only in minor amounts or in thin (less than 7 mils) coating layers, or in combination with lighter colored abrasive particles, such as green silicon carbide).

The composition of abrasive particles useful in the invention can be divided into two classes: natural abrasives and manufactured abrasives. Examples of useful natural abrasives include: diamond, corundum, emery, garnet (off-red color), buhrstone, chert, quartz, sandstone, chalcedony, flint, quartzite, silica, feldspar, pumice and talc. Examples of manufactured abrasives include: boron carbide, cubic boron nitride, fused alumina, ceramic aluminum oxide, heat treated aluminum oxide (both brown and dark gray), alumina zirconia, glass, silicon carbide (preferably green, although small amounts of black may be tolerated), iron oxides, tantalum carbide, cerium oxide, tin oxide, titanium carbide, synthetic diamond, manganese dioxide, zirconium oxide, and silicon nitride.

Abrasive particles useful in the invention typically and preferably have a particle size ranging from about 0.1 micrometer to about 1500 micrometers, more preferably ranging from about 0.1 micrometer to about 1300 micrometers. It is preferred that abrasive particles used in the invention have a Moh's hardness of at least 8, more preferably above 9; however, for specific applications, particles having Moh's hardness less than 8 may be used.

The term "abrasive particle" includes agglomerates of individual abrasive particles. An abrasive agglomerate is formed when a plurality of abrasive particles are bonded together with a binder to form a larger abrasive particle which may have a specific particulate structure. The plurality of particles which form the abrasive agglomerate may comprise more than one type of abrasive particle, and the binder used may be the same as or different from the binders used to bind the agglomerate to a backing.

Precisely shaped abrasive particles, as described in assignee's pending U.S. application Ser. No. 08/085,638, filed Jun. 30, 1993, may also be employed. These precisely shaped abrasive particles are produced essentially by coating a structured tool, similar to that described herein for making structured abrasive articles, with a slurry of abrasive particles and binder precursor, curing the binder precursor, and detaching the resulting composites from the tool by exposing the tool to an ultrasonic horn operating at about 20,000 Hz.

Optional Binder Precursor Additives

The coatable compositions of the invention, either with or devoid of abrasive particles, and thus the cured binders, may also comprise optional additives common to the skilled artisan in the abrasive art such as fibers, lubricants, wetting agents, surfactants, pigments, dyes, plasticizers, suspending agents, fillers (including grinding aids), rheology modifiers, coupling agents, and the like. The amounts of these materials will depend on the desired properties of the binder and the final use of the abrasive article which is being manufactured.

A. Fillers and Grinding Aids

Binders used to produce abrasive articles may, and preferably do, contain fillers. Fillers are typically organic or inorganic particulates dispersed within the resin and may modify either the binder precursor or the cured binder's properties, or both, or may simply be used to reduce cost.

The addition of a filler, at least up to a certain extent, typically increases the hardness and toughness of the cured binder. The filler is typically and preferably an inorganic particulate having an average particle size ranging from about 1 micrometer to about 100 micrometers, preferably from about 5 to about 50 micrometers, and most preferably from about 10 to about 25 micrometers. Moreover, the filler will preferably have a specific gravity in the range of 1.5 to 4.50, and the average particle size of the filler will preferably be less than the average particle size of the abrasive particles, depending on the ultimate use of the article.

Examples of useful non-reactive fillers for this invention include: metal carbonates such as calcium carbonate (in the form of chalk, calcite, marl, travertine, marble or limestone), calcium magnesium carbonate, sodium carbonate, and magnesium carbonate; silicas such as quartz, glass beads, glass bubbles and glass fibers; silicates such as talc, clays, feldspar, mica, calcium silicate, calcium metasilicate, sodium aluminosilicate, and sodium silicate; metal sulfates such as calcium sulfate, barium sulfate, sodium sulfate, aluminum sodium sulfate, and aluminum sulfate; gypsum; vermiculite; wood flour; aluminum trihydrate; carbon black; metal oxides such as calcium oxide (lime), aluminum oxide, titanium dioxide, alumina hydrate, alumina monohydrate; and metal sulfites such as calcium sulfite.

Generally, fillers are inorganic particulate matter which comprising materials which are substantially inert or non-reactive with respect to the grinding surface acted upon by the abrasive. Occasionally, however, active (i.e. reactive) fillers are used, sometimes referred to in the abrasives art as grinding aids. These fillers interact beneficially with the grinding surface during use. In particular, it is believed in the art that the grinding aid may either 1) decrease the friction between the abrasive particles and the workpiece being abraded, 2) prevent the abrasive particle from "capping", i.e. prevent metal particles from becoming welded to the tops of the abrasive particles, 3) decrease the interface temperature between the abrasive particles and the workpiece or 4) decrease the required grinding force.

Grinding aids encompass a wide variety of different materials and can be inorganic or organic based. Examples of chemical groups of grinding aids useful in this invention include waxes, organic halide compounds, halide salts and metals and their alloys. The organic halide compounds will typically break down during abrading and release a halogen acid or a gaseous halide compound. Examples of such materials include chlorinated waxes like tetrachloronaphthalene, pentachloronaphthalene; and polyvinyl chloride. Examples of halide salts include sodium chloride, potassium cryolite, sodium cryolite, ammonium cryolite, potassium tetrafluoroborate, sodium tetrafluoroborate, silicon fluorides, potassium chloride, magnesium chloride. Examples of metals include, tin, lead, bismuth, cobalt, antimony, cadmium, iron, and titanium. Other miscellaneous grinding aids include sulfur, organic sulfur compounds, graphite and metallic sulfides. The above mentioned examples of grinding aids is meant to be a representative showing of grinding aids, and it is not meant to encompass all grinding aids.

Grinding aids are preferably used in slurries and binder precursor dispersions of the invention in amounts ranging from about 0.1 to about 10 dry weight percent, more preferably from about 0.5 to about 5.0 weight percent, based on total weight of binder precursor solution. If non-reactive fillers are employed they may be used up to 50 dry weight percent.

Of the above, certain clays tend to produce a controlled erosion of the binder produced from the inventive coatable compositions, which is especially important in lapping coated abrasives. The incorporation of these useful clays is disclosed and claimed in assignees' copending U.S. Pat. No. 5,342,419 (Hibbard), which is incorporated herein by reference for its teaching of such clays.

B. Rheology Modifiers

Rheology modifying particles, such as those disclosed and claimed in assignee's pending U.S. Pat. No. 5,368,619, incorporated by reference herein, may be added to the coatable compositions of the invention, which have the effect of lowering the composition viscosity and reduce the rate of sedimentation of abrasive and/or filler particles in the binder precursors. As found by Culler, the addition of modifying particles, whose average particle size is preferably less than the average particle size of the abrasive or filler particles, act to reduce the viscosity of coatable compositions, and retain abrasive and filler particles in suspension for long periods of time without agitation.

Preferably, the average particle size of the modifying particles is less than about 100 millimicrometers, more preferably less than about 50 millimicrometers. Individual modifying particles may range in particle size from about 1 millimicrometer to about 100 millimicrometers, more preferably ranging from about 10 millimicrometers to about 25 millimicrometers, depending on the average particle size of the abrasive and/or filler particles in the coatable composition.

Preferred fillers include silica particles such as those available from the Degussa Corp., Ridgefield Park, N.J. under the tradenames "OX-50", "R-812", and "P-820", the first being an amorphous silica having average particle size of 40 millimicrometers, surface area of 50 m²/g, the second being a hydrophobic fumed silica having average particle size of 7 millimicrometers and surface area of 260 m²/g, and the third being a precipitated silica having average particle size of 15 millimicrometers and surface area of 100 m²/g.

Amorphous silica particles, if used, are preferably at least 90% pure, more preferably at least 95% pure and most preferably at least 99% pure. The major impurities are primarily other metal oxides such as aluminum oxide, iron oxide and titanium dioxide. Amorphous silica particles tend to be spherical in shape and have a density between 2.1 to 2.5 g/cm³.

Modifying particles, if used, are preferably present in the coatable compositions from about 0.01 dry weight percent to about 30 dry weight percent, more preferably from about 0.05 to about 10 weight percent, and most preferably from about 0.5 to about 5 weight percent.

C. Coupling Agents

The inventive coatable compositions may also contain coupling agents if further viscosity reduction is required, such as disclosed by DeWald, U.S. Pat. No. 4,871,376, incorporated by reference herein. Coupling agents may also function to form a stronger bond between inorganic particles and organic binders, or the backing.

An example of a coupling agent found suitable for use in this invention is the compound γ-methacryloxypropyltrimethoxysilane, available under the trade designation "A-174" from Union Carbide Corporation. Other suitable coupling agents are zircoaluminates, and titanates. Further examples which illustrate the use of silane, titanate, and zircoaluminate coupling agents are disclosed in U.S. Pat. No. 4,871,376, which was previously partially incorporated herein by reference.

Coupling agents, if present, typically and preferably range from about 0.1 to about 3.0 dry weight percent of the total dry weight of the coatable compositions.

D. Dyes, Pigments and Colorants

The coatable compositions of the invention are particularly well suited for producing colored abrasive articles, such as colored lapping abrasive articles. Although some dyes are useful as sensitizers (as noted above), others are used primarily for aesthetic purposes.

Suitable and preferred compounds for inclusion in the abrasive articles of the present invention are organic dyestuff compounds, inorganic pigments, and polymeric colorants. Suitable inorganic pigments useful in the invention include carbon black, titanium dioxide, chromium oxide, yellow iron oxide, red iron oxide, metal ferrites, and mixtures of these. Suitable organic dyestuffs include compounds such as phthalocyanine green and phthalocyanine blue.

Suitable polymeric colorants include those known under the trade designations "Reactint Blue X17AB", "Reactint Yellow X15", "Reactint Red X52", and "Reactint Orange X38", all available from Milliken Research Corporation, Spartanburg, S.C. These polymeric colorants are suitable for incorporation in a resin with the formation of covalent bonds between reactive moieties in the resin and the colorant. They have the following generic formula:

R-(polymeric constituent-X)$_n$ wherein R is an organic dyestuff radical; the polymeric constituent is selected from polyalkyleneoxides and copolymers of polyalkylene oxides in which the alkylene moiety of the polymeric constituent contains 2 or more carbon atoms and such polymeric constituent has an average molecular weight of from about 44 to about 1500, more preferably ranging from about 80 to about 800; n is an integer of from 1 to about 6; and X is selected from —OH, —NH₂ and —SH. Compounds within this generic formula are described with particularity in U.S. Pat. No. 4,284,729, which is incorporated herein by reference. Although the '729 patent describes their use in thermosetting resins, U.S. Pat. No. 4,812,141 describes their use in thermoplastic resin systems.

The organic dyestuff radical R may vary widely, depending to a large extent upon the desired color and properties of the final abrasive product. Preferably, for use in the present invention, the organic dyestuff radical R may be selected from nitroso, nitro, azo, including monoazo, diazo, and triazo, diarylmethane, triarylmethane, xanthene, acridene, methine, thiazole, indamine, azine, oxazine, or anthraquinone dyestuff radicals. Particularly useful are the azo, anthraquinone and triarylmethane dyestuff radicals.

The polymeric constituent of the colorants within the above generic formula may be any suitable polymeric constituent which renders the resulting colorant liquid. Typical of such polymeric constituents which may be attached to the dyestuff radical are the polymeric epoxides, such as the polyalkylene oxides and copolymers thereof. Typical polyalkylene oxides and copolymers of same which may be employed to provide liquid colorants are polyethylene oxides, polypropylene oxides, polybutene oxides, copolymers of polyethylene oxides, polypropylene oxides and polybutene oxides, and other copolymers including block copolymers, in which a majority of the polymeric constituent is polyethylene oxide, polypropylene oxide and/or polybutene oxide. Such polymeric constituents may have an average molecular weight in the range of from about 44 to about 1500, preferably from about 80 to about 800.

The above-mentioned polymeric colorants known under the trade designation "Reactint" have —OH as the X group. For such colorants, a "hydroxyl number" may be given to further characterized the colorant, wherein:

hydroxyl number=56,100/(hydroxyl eq. wt.) where "hydroxyl eq. wt." is the hydroxyl equivalent weight of the polymeric colorant. The colorants used in the Examples of the present invention have the following hydroxyl numbers:

| Polymeric Colorant | Hydroxyl Number |
| --- | --- |
| "Reactint Blue X17AB" | 210 |
| "Reactint Yellow X15" | 84 |
| "Reactint Red X52" | 150 |
| "Reactint Orange X38" | 105 |

The amount and type of dye, pigment and/or colorant which may be used may vary in accordance with the particular resin, photoinitiator system, and other additives present. The amount and type desired may also vary according to the use of the article. When polymeric colorants known under the trade designation "Reactint" are employed in a slurry of 40 micrometer white aluminum oxide (69 parts), amorphous silica known under the trade designation "OX-50" (1 part), coupling agent known under the trade designation "A-174" (1 part), resin (29 parts of a blend consisting of 50 parts TATHEIC, 50 parts TMPTA, and 1 part photoinitiator), a typical amount of blue colorant available from Milliken Corp., Spartanburg, S.C., known under the trade designation "Reactint Blue X17AB" would be about 0.3 part. It is anticipated that this amount could range from 0.1 part up to about 2 parts.

Bonded Abrasives

To make a bonded abrasive, a slurry of the invention is made consisting essentially of a polymerizable resin, abrasive particles and photoinitiator system. Optionally, coupling agents may also be introduced into the slurry before the slurry is poured into a mold. If a silane coupling agent is used, it may not necessary to coat the mold inner surface with a mold release agent. However, when desired, a mold release material may be coated on the surface of the mold to be exposed to the slurry, such as the mold release known under the trade designation "IMS Silicon Spray Parting Agent", no. S-512. Alternatively, the mold could have a non-stick surface, made of a material such as polytetrafluoroethylene or the like.

The slurry is then poured into the selected mold, and subsequently subjected to curing conditions as previously described. Optionally, pressure may be applied to the system during curing. Once the resin is cured, the resulting bonded abrasive is removed from the mold.

Nonwoven Abrasive Articles

Nonwoven abrasive articles comprise an open, lofty, three-dimensional web of fibers bound together at points where they contact by a binder. The binder of such a construction may be made using the coatable compositions of the invention, wherein the binder may be applied by any one of a number of suitable techniques, such as roll coating, spray coating, and the like. Abrasive particles may or may not be attached to the fibers. Methods of making nonwoven web substrates for nonwoven abrasive articles are described in U.S. Pat. No. 3,688,453 (Legacy et al.), which is incorporated herein by reference.

Methods of Abrading a Workpiece Surface

Another aspect of this invention pertains to a method of abrading a surface, in particular metal surfaces. This method involves bringing into frictional contact an abrasive article of this invention with a workpiece having a metal surface. The term "abrading" means that a portion of the metal workpiece is cut or removed by the abrasive article. Additionally, the surface finish associated with the workpiece surface is typically and preferably refined during this process. One typical surface finish measurement is $R_a$; $R_a$ is the arithmetic surface finish generally measured in microinches or micrometers. The surface finish can be measured by a profilometer, such as those known under the trade designations "Perthometer M4P" (available from Mahrseinpruef Corp., Cincinnati, Ohio) and "Surtronic 3" (made by Taylor Hobson Inc. and available from Mausmer Equipment Company, East Meadow, N.Y.).

The metal workpiece can be any type of metal such as mild steel, stainless steel, titanium, metal alloys, exotic metal alloys and the like. The workpiece may be flat or may have a shape or contour associated with it.

Depending upon the application, the force at the abrading interface can range from about 0.1 kg to over 1000 kg. Generally this range is from 1 kg to 500 kg of force at the abrading interface. Also depending upon the application, there may be a liquid present during abrading. This liquid can be water and/or an organic compound. Examples of typical organic compounds include lubricants, oils, emulsified organic compounds, cutting fluids, soaps, and the like. These liquids may also contain other additives such as defoamers, degreasers, corrosion inhibitors, or the like. The abrasive article may oscillate at the abrading interface during use. In some instances, this oscillation may result in a finer surface on the workpiece being abraded.

The abrasive articles of the invention can be used by hand or used in conjunction with a machine. At least one or both of the abrasive article and the workpiece is moved relative to the other during grinding. The abrasive article can be converted into a belt, tape roll, disc, sheet, and the like. For belt applications, the two free ends of an abrasive sheet are joined together and a splice is formed. It is also within the scope of this invention to use a spliceless belt like that described in the assignee's pending Patent Cooperation Treaty application no. 9312911, published Jul. 8, 1993, incorporated herein by reference. Generally the endless abrasive belt traverses over at least one idler roll and a platen or contact wheel. The hardness of the platen or contact wheel is adjusted to obtain the desired rate of cut and workpiece surface finish. The abrasive belt speed depends upon the desired cut rate and surface finish. The belt dimensions can range from about 5 mm to 1,000 mm wide and from about 5 mm to 10,000 mm long. Abrasive tapes are continuous lengths of the abrasive article. They can range in width from about 1 mm to 1,000 mm, generally between 5 mm to 250 mm. The abrasive tapes are usually unwound, traverse over a support pad that forces the tape against the workpiece and then rewound. The abrasive tapes can be continuously fed through the abrading interface and can be indexed. The abrasive disc can range from about 50 mm to 1,000 mm in diameter. Typically abrasive discs are secured to a back-up pad by an attachment means. These abrasive discs can rotate between 100 to 20,000 revolutions per minute, typically between 1,000 to 15,000 revolutions per minute.

Test Methods

Test Procedure I: Finish Quality Test ($R_a$)

Finish quality was measured in accordance with the commonly used statistical parameter "$R_a$", which is a measure of the average surface roughness. $R_a$ is defined in the publication "An Introduction to Surface Texture and Part Geometry" by Industrial Metal Products Incorporated, the complete disclosure of which is incorporated herein by reference, as the arithmetic average of the scratch depth in microinches. The ideal case is where a large amount of material is removed ("cut") from a workpiece while the $R_a$ value is low.

Test Procedure II: Robot Belt Grinding Test

The cured abrasive article was converted into an endless belt (7.6 cm wide×335 cm length) and the cut performance measured on a constant load surface grinder. A preweighed 1018 mild steel workpiece approximately 2.5 cm×5 cm×18 cm was mounted in the specimen holder and the workpiece positioned vertically in the apparatus, with the 2.5 cm×18 cm face facing a serrated rubber contact wheel (approximately 36 cm in diameter and having an 85 Shore A durometer) with one on one lands. The endless belt was placed over the rubber contact wheel such that the abrasive surface of the belt contacted the workpiece. The workpiece was then reciprocated through an 18 cm path at a rate of 20 cycles per minute while the belt, which was rotated at a speed of approximately 2050 meters per minute, was urged against the workpiece by a spring loaded plunger which maintained a load of 4.5 kilograms. Initial cut was determined after a one minute elapsed grinding time, after which the workpiece was removed and reweighed to determine the amount of stock that was removed. The procedure was repeated at one minute intervals, placing a new workpiece in the specimen holder prior to beginning a new grinding cycle. The endpoint of the test was 20 complete grinding cycles and the final cut data was the cut measured on the twentieth grinding cycle.

Test Procedure III: Slide Action Disc Test

A 17.8 cm (7 inch) diameter disc of the abrasive article was mounted on a beveled aluminum back-up pad and used to grind the face of a 1.25 cm×18 cm 1018 mild steel workpiece. The disc was driven at 5,500 rpm while the portion of the disc overlying the beveled edge of the back-up pad contacted the workpiece, which was maintained at a 7° angle with respect to the disc, at about a 6 kg load. The workpiece was moved back and forth under the disc during the grinding test so as to contact, over time, the entire surface of the workpiece. The workpiece was replaced at one minute intervals and the test continued until the cut on the last workpiece was less than one gram. The initial cut was the amount of metal removed in the first minute of grinding. Likewise, the final cut was the amount of metal removed in the last minute of grinding and the total cut was the summation of the amount of metal removed throughout the test. Cut data is the average of four discs unless otherwise noted.

Test Procedure IV: Schiefer Cut Test

The abrasive article was converted into a disc (12.7 cm diameter) and secured to a foam back-up pad by means of a pressure sensitive adhesive. The abrasive disc/back-up pad assembly was installed on a Schiefer testing machine and the abrasive disc used to abrade a workpiece made of poly (methylmethacrylate). A load of 4.5 kg was applied to the abrasive disc and all of the testing was conducted beneath a water flood. The endpoint of the test was 500 revolutions or cycles of the abrasive disc. The poly(methylmethacrylate) workpiece was weighed before and after the test to determine the amount of material abraded away by the disc.

Test Procedure V: Disc Cut Test

The Disc Cut Test measures the amount of steel die rule cut or abraded as well as the amount of abrasive grain/web loss. A 17.8 cm diameter disc of the nonwoven abrasive was placed on a #917 Disc Pad Holder (available from 3M) and the holder mounted on the right angle drive unit of the test apparatus. The workpiece, which was oriented at a 7° angle from a normal position to the test disc, consisted of three equally spaced die rule steel blades (6.5 cm spacing), mounted such that the dull or blunt edge of the die rule impinged on the test disc. The abrasive disc was rotated at a speed of 4580 rpm and traversed the workpiece in 21 seconds while being urged against the workpiece by a constant load of 5.6 kg. Both the workpiece and the test disc were weighed before and after the test to determine the amount of metal cut or abraded from the workpiece and the amount of abrasive/web loss, respectively.

EXAMPLES

The following non-limiting Examples will further illustrate the invention. All parts, percentages, ratios, and the like, in the examples are by weight unless otherwise indicated.

The abrasive articles produced and used in the Examples below were made according to the General Procedure for Preparing the Abrasive Article, and the abrasive articles were tested according to the test procedures described above.

General Procedure for Preparing Structured Abrasive Articles

The abrasive articles of the Examples employing coatable compositions of the invention were made generally in accordance with assignee's U.S. Pat. No. 5,152,917 (Pieper et al.), which was previously incorporated herein by reference. The slurry used in each case was coated onto a production tool having a pyramidal type pattern such that the slurry filled the tool. The pyramids were placed such that their bases were butted up against one another. A more exact explanation as to the size and shape of the projections of the production tool used in the Examples may be found hereinbelow. This pattern is generally illustrated in FIG. 2 herein (FIG. 1 of Pieper et al.).

Next, a polyester film having an ethylene acrylic acid copolymer primer was pressed against the production tool by means of a roller so that the slurry wetted the front surface of the polyester film.

Ultraviolet and/or visible light was then transmitted through the polyester film and into the slurry. The light initiated the polymerization of the radiation curable resin contained in the slurry, resulting in the slurry being transformed into an abrasive composite, with the abrasive composite being adhered to the polyester film backing. The ultraviolet light sources used are discussed in the Examples. Finally, the polyester film/abrasive composite was separated from the production tool, providing a structured abrasive.

Reference UV Spectral Data

A portion of the UV spectral data, from 370 to 500 nanometers, of several α-cleavage photoiniators of the invention, as well as two comparative α-cleavage photoinitiators which are not of the invention, are shown below in Tables I–VIII. The reference spectra 1 and 2 (Tables I and II) and comparative spectra 1 and 2 (Tables III and IV), illustrate that at the two concentrations measured, the molar absorptivity for each photoinitiator tested did not change significantly, indicating adherence to Beer's law. The definition of the photoinitiator systems within the invention clearly includes all the photoinitiators shown in the reference spectra, and excludes photoinitiators of comparative photoinitiator spectra 1-3 (Tables II, IV, and VII) 2,2-dimethyl-1,2-diphenyl ethanone (known under the trade designation Irgacure 651) and 2,2-dimethyl-2-hydroxy-1-phenylethanone (known under the trade designation Darocur 1173.

TABLE I

REFERENCE SPECTRA 1
Molar Absorptivity for Irgacure 907 in Methanol
41.480 mg/100 Ml (0.00137 Molar)

| nm[1] | e[2] | nm | e | nm | e |
|---|---|---|---|---|---|
| 370 | 8.70E+01 | 414 | 1.17E+00 | 458 | 2.19E−01 |
| 372 | 7.01E+01 | 416 | 9.50E−01 | 460 | 2.19E−01 |
| 374 | 5.67E+01 | 418 | 8.04E−01 | 462 | 2.19E−01 |
| 376 | 4.61E+01 | 420 | 8.04E−01 | 464 | 2.19E−01 |
| 378 | 3.74E+01 | 422 | 6.57E−01 | 466 | 2.19E−01 |
| 380 | 2.94E+01 | 424 | 5.11E−01 | 468 | 2.92E−01 |
| 382 | 2.39E+01 | 426 | 5.11E−01 | 470 | 2.19E−01 |
| 384 | 1.94E+01 | 428 | 4.38E−01 | 472 | 1.46E−01 |
| 386 | 1.58E+01 | 430 | 4.38E−01 | 474 | 1.46E−01 |
| 388 | 1.29E+01 | 432 | 5.11E−01 | 476 | 7.30E−02 |
| 390 | 1.04E+01 | 434 | 3.65E−01 | 478 | 1.46E−01 |
| 392 | 8.55E+00 | 436 | 4.38E−01 | 480 | 1.46E−01 |
| 394 | 6.87E+00 | 438 | 4.38E−01 | 482 | 2.19E−01 |
| 396 | 5.77E+00 | 440 | 3.65E−01 | 484 | 2.19E−01 |
| 398 | 4.75E+00 | 442 | 2.92E−01 | 486 | 2.19E−01 |
| 400 | 3.87E+00 | 444 | 3.65E−01 | 488 | 2.19E−01 |
| 402 | 3.21E+00 | 446 | 3.65E−01 | 490 | 1.46E−01 |
| 404 | 2.78E+00 | 448 | 2.92E−01 | 492 | 1.46E−01 |
| 406 | 2.34E+00 | 450 | 2.92E−01 | 494 | 1.46E−01 |
| 408 | 1.90E+00 | 452 | 2.92E−01 | 496 | 2.19E−01 |
| 410 | 1.53E+00 | 454 | 2.92E−01 | 498 | 1.46E−01 |
| 412 | 1.39E+00 | 456 | 2.92E−01 | 500 | 2.19E−01 |

[1]"nm" denotes the light wavelength in nanometers
[2]"e" denotes molar absorptivity in liter/mole − cm

TABLE II

REFERENCE SPECTRA 2
Molar Absorptivity for Irgacure 907 in Methanol
88.688 mg/100 Ml (0.00293 Molar)

| nm[1] | e[2] | nm | e | nm | e |
|---|---|---|---|---|---|
| 370 | 8.65E+01 | 414 | 9.91E−01 | 458 | 1.02E−01 |
| 372 | 6.98E+01 | 416 | 8.20E−01 | 460 | 1.37E−01 |
| 374 | 5.65E+01 | 418 | 6.83E−01 | 462 | 1.37E−01 |
| 376 | 4.58E+01 | 420 | 6.15E−01 | 464 | 1.02E−01 |
| 378 | 3.72E+01 | 422 | 5.12E−01 | 466 | 6.83E−02 |

TABLE II-continued

REFERENCE SPECTRA 2
Molar Absorptivity for Irgacure 907 in Methanol
88.688 mg/100 Ml (0.00293 Molar)

| nm[1] | e[2] | nm | e | nm | e |
|---|---|---|---|---|---|
| 380 | 2.93E+01 | 424 | 4.44E−01 | 468 | 1.37E−01 |
| 382 | 2.37E+01 | 426 | 3.76E−01 | 470 | 1.02E−01 |
| 384 | 1.92E+01 | 428 | 3.42E−01 | 472 | 6.83E−02 |
| 386 | 1.56E+01 | 430 | 3.42E−01 | 474 | 6.83E−02 |
| 388 | 1.26E+01 | 432 | 3.07E−01 | 476 | 6.83E−02 |
| 390 | 1.03E+01 | 434 | 2.73E−01 | 478 | 6.83E−02 |
| 392 | 8.34E+00 | 436 | 2.73E−01 | 480 | 6.83E−02 |
| 394 | 6.76E+00 | 438 | 2.39E−01 | 482 | 6.83E−02 |
| 396 | 5.57E+00 | 440 | 2.05E−01 | 484 | 1.02E−01 |
| 398 | 4.54E+00 | 442 | 1.71E−01 | 486 | 1.02E−01 |
| 400 | 3.69E+00 | 444 | 1.71E−01 | 488 | 1.02E−01 |
| 402 | 3.04E+00 | 446 | 2.05E−01 | 490 | 1.02E−01 |
| 404 | 2.53E+00 | 448 | 1.71E−01 | 492 | 6.83E−02 |
| 406 | 2.12E+00 | 450 | 1.37E−01 | 494 | 1.02E−01 |
| 408 | 1.71E+00 | 452 | 1.37E−01 | 496 | 6.83E−02 |
| 410 | 1.37E+00 | 454 | 1.71E−01 | 498 | 6.83E−02 |
| 412 | 1.20E+00 | 456 | 1.71E−01 | 500 | 1.02E−01 |

[1]"nm" denotes the light wavelength in nanometers
[2]"e" denotes molar absorptivity in liter/mole − cm

TABLE III

COMPARATIVE SPECTRA 1
Molar Absorptivity for Irgacure 651 in Methanol
65.126 mg/100 Ml (0.00254 Molar)

| nm[1] | e[2] | nm | e | nm | e |
|---|---|---|---|---|---|
| 370 | 6.67E+01 | 414 | 3.93E−02 | 458 | 0.00E+00 |
| 372 | 5.39E+01 | 416 | 0.00E+00 | 460 | 0.00E+00 |
| 374 | 4.23E+01 | 418 | 3.93E−02 | 462 | 0.00E+00 |
| 376 | 3.23E+01 | 420 | 3.93E−02 | 464 | 0.00E+00 |
| 378 | 2.39E+01 | 422 | 0.00E+00 | 466 | 0.00E+00 |
| 380 | 1.62E+01 | 424 | 0.00E+00 | 468 | 0.00E+00 |
| 382 | 1.10E+01 | 426 | 0.00E+00 | 470 | 0.00E+00 |
| 384 | 7.19E+00 | 428 | 0.00E+00 | 472 | 0.00E+00 |
| 386 | 4.52E+00 | 430 | 0.00E+00 | 474 | 0.00E+00 |
| 388 | 2.67E+00 | 432 | 0.00E+00 | 476 | 0.00E+00 |
| 390 | 1.49E+00 | 434 | 0.00E+00 | 478 | 0.00E+00 |
| 392 | 8.25E−01 | 436 | 0.00E+00 | 480 | 0.00E+00 |
| 394 | 3.93E−01 | 438 | 0.00E+00 | 482 | 0.00E+00 |
| 396 | 2.36E−01 | 440 | 0.00E+00 | 484 | 0.00E+00 |
| 398 | 1.18E−01 | 442 | 0.00E+00 | 486 | 0.00E+00 |
| 400 | 7.86E−02 | 444 | 0.00E+00 | 488 | 0.00E+00 |
| 402 | 0.00E+00 | 446 | 0.00E+00 | 490 | 0.00E+00 |
| 404 | 3.93E−02 | 448 | 0.00E+00 | 492 | 0.00E+00 |
| 406 | 3.93E−02 | 450 | 0.00E+00 | 494 | 0.00E+00 |
| 408 | 0.00E+00 | 452 | 0.00E+00 | 496 | 0.00E+00 |
| 410 | 0.00E+00 | 454 | 0.00E+00 | 498 | 0.00E+00 |
| 412 | 0.00E+00 | 456 | 0.00E+00 | 500 | 0.00E+00 |

[1]"nm" denotes the light wavelength in nanometers
[2]"e" denotes molar absorptivity in liter/mole − cm

TABLE IV

COMPARATIVE SPECTRA 2
Molar Absorptivity for Irgacure 651 in Methanol
107.191 mg/100 Ml (0.00419 Molar)

| nm[1] | e[2] | nm | e | nm | e |
|---|---|---|---|---|---|
| 370 | 6.67E+01 | 414 | 4.78E−02 | 458 | 2.39E−02 |
| 372 | 5.39E+01 | 416 | 4.78E−02 | 460 | 2.39E−02 |
| 374 | 4.23E+01 | 418 | 4.78E−02 | 462 | 4.78E−02 |
| 376 | 3.22E+01 | 420 | 4.78E−02 | 464 | 2.39E−02 |
| 378 | 2.39E+01 | 422 | 4.78E−02 | 466 | 2.39E−02 |
| 380 | 1.62E+01 | 424 | 2.39E−02 | 468 | 4.78E−02 |
| 382 | 1.10E+01 | 426 | 2.39E−02 | 470 | 4.78E−02 |

TABLE IV-continued

COMPARATIVE SPECTRA 2
Molar Absorptivity for Irgacure 651 in Methanol
107.191 mg/100 Ml (0.00419 Molar)

| nm[1] | e[2] | nm | e | nm | e |
|---|---|---|---|---|---|
| 384 | 7.19E+00 | 428 | 2.39E−02 | 472 | 2.39E−02 |
| 386 | 4.51E+00 | 430 | 4.78E−02 | 474 | 0.00E+00 |
| 388 | 2.72E+00 | 432 | 4.78E−02 | 476 | 0.00E+00 |
| 390 | 1.58E+00 | 434 | 2.39E−02 | 478 | 2.39E−02 |
| 392 | 8.84E−01 | 436 | 4.78E−02 | 480 | 2.39E−02 |
| 394 | 4.78E−01 | 438 | 4.78E−02 | 482 | 4.78E−02 |
| 396 | 3.34E−01 | 440 | 2.39E−02 | 484 | 2.39E−02 |
| 398 | 2.15E−01 | 442 | 2.39E−02 | 486 | 4.78E−02 |
| 400 | 1.43E−01 | 444 | 4.78E−02 | 488 | 4.78E−02 |
| 402 | 1.19E−01 | 446 | 4.78E−02 | 490 | 4.78E−02 |
| 404 | 1.19E−01 | 448 | 2.39E−02 | 492 | 4.78E−02 |
| 406 | 9.55E−02 | 450 | 2.39E−02 | 494 | 4.78E−02 |
| 408 | 7.16E−02 | 452 | 2.39E−02 | 496 | 4.78E−02 |
| 410 | 4.78E−02 | 454 | 4.78E−02 | 498 | 2.39E−02 |
| 412 | 7.16E−02 | 456 | 4.78E−02 | 500 | 4.78E−02 |

[1]"nm" denotes the light wavelength in nanometers
[2]"e" denotes molar absorptivity in liter/mole − cm

TABLE V

REFERENCE SPECTRA 3
Molar Absorptivity for Irgacure 369 in Methanol
140.6 mg/100 Ml (0.00399 Molar)

| nm[1] | e[2] | nm | e | nm | e |
|---|---|---|---|---|---|
| 370 | 1.23E+03 | 414 | 5.47E+01 | 458 | 1.38E+00 |
| 372 | 1.11E+03 | 416 | 4.69E+01 | 460 | 1.18E+00 |
| 374 | 1.09E+03 | 418 | 4.01E+01 | 462 | 1.03E+00 |
| 376 | 9.74E+02 | 420 | 3.42E+01 | 464 | 9.01E−01 |
| 378 | 8.43E+02 | 422 | 2.90E+01 | 466 | 7.51E−01 |
| 380 | 6.96E+02 | 424 | 2.47E+01 | 468 | 6.76E−01 |
| 382 | 5.90E+02 | 426 | 2.09E+01 | 470 | 6.01E−01 |
| 384 | 5.03E+02 | 428 | 1.77E+01 | 472 | 5.26E−01 |
| 386 | 4.30E+02 | 430 | 1.49E+01 | 474 | 4.26E−01 |
| 388 | 3.69E+02 | 432 | 1.25E+01 | 476 | 4.01E−01 |
| 390 | 3.18E+02 | 434 | 1.06E+01 | 478 | 3.50E−01 |
| 392 | 2.74E+02 | 436 | 8.84E+00 | 480 | 3.25E−01 |
| 394 | 2.37E+02 | 438 | 7.46E+00 | 482 | 2.50E−01 |
| 396 | 2.05E+02 | 440 | 6.26E+00 | 484 | 2.25E−01 |
| 398 | 1.78E+02 | 442 | 5.23E+00 | 486 | 2.50E−01 |
| 400 | 1.54E+02 | 444 | 4.38E+00 | 488 | 2.25E−01 |
| 402 | 1.33E+02 | 446 | 3.66E+00 | 490 | 1.75E−01 |
| 404 | 1.15E+02 | 448 | 3.10E+00 | 492 | 1.50E−01 |
| 406 | 9.97E+01 | 450 | 2.63E+00 | 494 | 1.75E−01 |
| 408 | 8.61E+01 | 452 | 2.20E+00 | 496 | 1.50E−01 |
| 410 | 7.43E+01 | 454 | 1.90E+00 | 498 | 1.25E−01 |
| 412 | 6.38E+01 | 456 | 1.63E+00 | 500 | 1.50E−01 |

[1]"nm" denotes the light wavelength in nanometers
[2]"e" denotes molar absorptivity in liter/mole − cm

TABLE VI

REFERENCE SPECTRA 4
Molar Absorptivity for TPO in Methanol
120.8 mg/100 Ml (0.00348 Molar)

| nm[1] | e[2] | nm | e | nm | e |
|---|---|---|---|---|---|
| 370 | 5.16E+02 | 414 | 2.14E+01 | 458 | 0.00E+00 |
| 372 | 5.19E+02 | 416 | 1.28E+01 | 460 | 0.00E+00 |
| 374 | 5.35E+02 | 418 | 7.68E+00 | 462 | 0.00E+00 |
| 376 | 5.62E+02 | 420 | 4.60E+00 | 464 | 0.00E+00 |
| 378 | 5.85E+02 | 422 | 2.76E+00 | 466 | 0.00E+00 |
| 380 | 5.91E+02 | 424 | 1.67E+00 | 468 | 0.00E+00 |
| 382 | 5.69E+02 | 426 | 9.78E−01 | 470 | 0.00E+00 |
| 384 | 5.28E+02 | 428 | 6.04E−01 | 472 | 0.00E+00 |
| 386 | 4.81E+02 | 430 | 3.45E−01 | 474 | 0.00E+00 |

TABLE VI-continued

REFERENCE SPECTRA 4
Molar Absorptivity for TPO in Methanol
120.8 mg/100 Ml (0.00348 Molar)

| nm[1] | e[2] | nm | e | nm | e |
|---|---|---|---|---|---|
| 388 | 4.41E+02 | 432 | 1.73E−01 | 476 | 0.00E+00 |
| 390 | 4.13E+02 | 434 | 5.75E−02 | 478 | 0.00E+00 |
| 392 | 3.97E+02 | 436 | 2.88E−02 | 480 | 0.00E+00 |
| 394 | 3.86E+02 | 438 | 0.00E+00 | 482 | 0.00E+00 |
| 396 | 3.69E+02 | 440 | 0.00E+00 | 484 | 0.00E+00 |
| 398 | 3.39E+02 | 442 | 0.00E+00 | 486 | 0.00E+00 |
| 400 | 2.94E+02 | 444 | 0.00E+00 | 488 | 0.00E+00 |
| 402 | 2.39E+02 | 446 | 0.00E+00 | 490 | 0.00E+00 |
| 404 | 1.82E+02 | 448 | 0.00E+00 | 492 | 0.00E+00 |
| 406 | 1.30E+02 | 450 | 0.00E+00 | 494 | 0.00E+00 |
| 408 | 8.86E+01 | 452 | 0.00E+00 | 496 | 0.00E+00 |
| 410 | 5.72E+01 | 454 | 0.00E+00 | 498 | 0.00E+00 |
| 412 | 3.53E+01 | 456 | 0.00E+00 | 500 | 0.00E+00 |

[1]"nm" denotes the light wavelength in nanometers
[2]"e" denotes molar absorptivity in liter/mole − cm

TABLE VII

COMPARATIVE SPECTRA 3
Molar Absorptivity for Darocur 1173 in Methanol
82.2 mg/50 mL (0.01002 Molar)

| nm[1] | e[2] | nm | e | nm | e |
|---|---|---|---|---|---|
| 370 | 6.89E+00 | 414 | 0.00E+00 | 458 | 0.00E+00 |
| 372 | 5.26E+00 | 416 | 0.00E+00 | 460 | 0.00E+00 |
| 374 | 3.91E+00 | 418 | 0.00E+00 | 462 | 0.00E+00 |
| 376 | 2.82E+00 | 420 | 0.00E+00 | 464 | 0.00E+00 |
| 378 | 1.95E+00 | 422 | 0.00E+00 | 466 | 0.00E+00 |
| 380 | 1.21E+00 | 424 | 0.00E+00 | 468 | 0.00E+00 |
| 382 | 7.48E−01 | 426 | 0.00E+00 | 470 | 0.00E+00 |
| 384 | 4.59E−01 | 428 | 0.00E+00 | 472 | 0.00E+00 |
| 386 | 2.79E−01 | 430 | 0.00E+00 | 474 | 0.00E+00 |
| 388 | 1.70E−01 | 432 | 0.00E+00 | 476 | 0.00E+00 |
| 390 | 9.98E−02 | 434 | 0.00E+00 | 478 | 0.00E+00 |
| 392 | 6.98E−02 | 436 | 0.00E+00 | 480 | 0.00E+00 |
| 394 | 3.99E−02 | 438 | 0.00E+00 | 482 | 0.00E+00 |
| 396 | 2.99E−02 | 440 | 0.00E+00 | 484 | 0.00E+00 |
| 398 | 2.00E−02 | 442 | 0.00E+00 | 486 | 0.00E+00 |
| 400 | 9.98E−03 | 444 | 0.00E+00 | 488 | 0.00E+00 |
| 402 | 0.00E+00 | 446 | 0.00E+00 | 490 | 9.98E−03 |
| 404 | 0.00E+00 | 448 | 0.00E+00 | 492 | 0.00E+00 |
| 406 | 0.00E+00 | 450 | 0.00E+00 | 494 | 0.00E+00 |
| 408 | 0.00E+00 | 452 | 0.00E+00 | 496 | 9.98E−03 |
| 410 | 0.00E+00 | 454 | 0.00E+00 | 498 | 0.00E+00 |
| 412 | 0.00E+00 | 456 | 0.00E+00 | 500 | 0.00E+00 |

[1]"nm" denotes the light wavelength in nanometers
[2]"e" denotes molar absorptivity in liter/mole − cm

TABLE VIII

REFERENCE SPECTRA 5
Molar Absorptivity for Darocur 4265 in Methanol
96.1 mg/50 Ml (0.00752 Molar)

| nm[1] | e[2] | nm | e | nm | e |
|---|---|---|---|---|---|
| 370 | 1.91E+02 | 414 | 7.82E+00 | 458 | 0.00E+00 |
| 372 | 1.91E+02 | 416 | 4.71E+00 | 460 | 0.00E+00 |
| 374 | 1.96E+02 | 418 | 2.83E+00 | 462 | 0.00E+00 |
| 376 | 2.04E+02 | 420 | 1.70E+00 | 464 | 0.00E+00 |
| 378 | 2.12E+02 | 422 | 1.04E+00 | 466 | 0.00E+00 |
| 380 | 2.14E+02 | 424 | 6.39E−01 | 468 | 0.00E+00 |
| 382 | 2.05E+02 | 426 | 3.86E−01 | 470 | 0.00E+00 |
| 384 | 1.91E+02 | 428 | 2.26E−01 | 472 | 0.00E+00 |
| 386 | 1.74E+02 | 430 | 1.46E−01 | 474 | 0.00E+00 |
| 388 | 1.59E+02 | 432 | 6.65E−02 | 476 | 0.00E+00 |
| 390 | 1.49E+02 | 434 | 2.66E−02 | 478 | 0.00E+00 |

TABLE VIII-continued

REFERENCE SPECTRA 5
Molar Absorptivity for Darocur 4265 in Methanol
96.1 mg/50 Ml (0.00752 Molar)

| nm[1] | e[2] | nm | e | nm | e |
|---|---|---|---|---|---|
| 392 | 1.43E+02 | 436 | 1.33E−02 | 480 | 0.00E+00 |
| 394 | 1.39E+02 | 438 | 0.00E+00 | 482 | 0.00E+00 |
| 396 | 1.33E+02 | 440 | 0.00E+00 | 484 | 0.00E+00 |
| 398 | 1.22E+02 | 442 | 0.00E+00 | 486 | 0.00E+00 |
| 400 | 1.06E+02 | 444 | 0.00E+00 | 488 | 0.00E+00 |
| 402 | 8.63E+01 | 446 | 0.00E+00 | 490 | 0.00E+00 |
| 404 | 6.59E+01 | 448 | 0.00E+00 | 492 | 0.00E+00 |
| 406 | 4.73E+01 | 450 | 0.00E+00 | 494 | 0.00E+00 |
| 408 | 3.22E+01 | 452 | 0.00E+00 | 496 | 0.00E+00 |
| 410 | 2.08E+01 | 454 | 0.00E+00 | 498 | 0.00E+00 |
| 412 | 1.29E+01 | 456 | 0.00E+00 | 500 | 0.00E+00 |

[1]"nm" denotes the light wavelength in nanometers
[2]"e" denotes molar absorptivity in liter/mole − cm

EXAMPLES 1–19

The cure speed of various photoinitiator systems was determined by incorporating the photoinitiator system into a slurry consisting of a 70:30 mixture of 40 micrometer white aluminum oxide (available from Micro Abrasive Corp., Westfield, Mass.) and a photocurable resin system. The resin system consisted of APC (0.5 parts, a hydrolyzed form of 3-(trimethyloxysilyl)-propyl methacrylate available from Union Carbide Corp., Danbury, Conn.) and 29.5 parts of a mixture consisting of 50 parts trimethylolpropane triacrylate (TMPTA, available from Sartomer Co., Exton, Pa.), 50 parts of tris-(2-acrylolethyl)isocyanurate (TATHEIC, also available from Sartomer Co.) and 1–2.5 parts of the photoinitiator system indicated in Table 1. The slurries were tapped into 4 mm diameter quartz tubes, the tubes taped to a platen and the platens run under a light source at speeds from about 3 m/minute (10 feet/minute) to about 54 m/minute (175 feet/minute) at a distance of 5.1 cm (2 inches) from the light source. Light sources used in this study were 25.4 cm (10 inch), 600 watt/2.54 cm light bulbs with the designations "H", "V", "D", and "Q", available from Fusion Systems, Corp, Rockville, Md. The quartz tubes were broken open after each exposure and the slurry probed with a paper clip to determine if it had cured. Table 2 reports the light sources and the maximum speed at which the abrasive slurry was just cured using the various bulbs. (It should be noted that the 4 mm diameter tube used represents a thickness which is much greater than that typically used or necessary to produce a useable abrasive.)

COMPARATIVE EXAMPLES C1–C31

The procedure of Examples 1–19 was repeated except that a number of conventional photoinitiator systems were substituted for the photoinitiator systems of the present invention. Table 3 reports the various compositions that were tested and Table 4 reports the maximum cure speeds for these compositions.

TABLE 1

Photoinitiator Systems
(Initiator Concentration in Parts per Hundred TATHEIC/TMPTA)

| Example | 1 | 2 | 3 | 4 | 5 | 6 | 7 | 8 | 9 | 10 | 11 |
|---|---|---|---|---|---|---|---|---|---|---|---|
| Darucur 4265[1] | 1.5 | — | — | — | — | — | — | — | — | — | — |
| Irgacure 907[2] | — | 1.0 | 1.0 | 1.0 | 1.0 | 1.0 | 1.0 | 1.0 | 1.0 | 1.0 | 1.0 |
| Irgacure 369[3] | — | — | — | — | — | — | — | — | — | — | — |

TABLE 1-continued

Photoinitiator Systems
(Initiator Concentration in Parts per Hundred TATHEIC/TMPTA)

| | | | | | | | | | | |
|---|---|---|---|---|---|---|---|---|---|---|
| ITX[4] | — | — | 0.5 | 0.5 | — | — | — | 0.5 | — | 0.5 | — |
| EDMAB[5] | — | — | — | 0.5 | — | 0.5 | — | — | — | — | — |
| CPQ[6] | — | — | — | — | 0.5 | 0.5 | — | — | 0.5 | — | 0.5 |
| Ph$_2$I$^+$PF$_6^-$[7] | — | — | — | — | — | — | 0.5 | 0.5 | 0.5 | — | — |
| TRIS[8] | — | — | — | — | — | — | — | — | — | 0.5 | 0.5 |

| Example | 12 | 13 | 14 | 15 | 16 | 17 | 18 | 19 |
|---|---|---|---|---|---|---|---|---|
| Darucur 4265[1] | — | — | — | — | — | — | — | — |
| Irgacure 907[2] | — | — | — | — | — | — | — | — |
| Irgacure 369[3] | 1.0 | 1.0 | 1.0 | 1.0 | 1.0 | 1.0 | 1.0 | 1.0 |
| ITX[4] | — | 0.5 | — | — | 0.5 | — | 0.5 | — |
| EDMAB[5] | — | — | — | — | — | — | — | — |
| CPQ[6] | — | — | 0.5 | — | — | 0.5 | — | 0.5 |
| Ph$_2$I$^+$PF$_6^-$[7] | — | — | — | 0.5 | 0.5 | 0.5 | — | — |
| TRIS[8] | — | — | — | — | — | — | 0.5 | 0.5 |

[1]. Darocur 4265, a 50:50 mixture of 2-hydroxy-2-methyl phenylpropan-1-one and 2,4,6-trimethyl benzoyl diphenyl phosphine oxide, available from CIBA GEIGY, Inc., Hawthorne, NY.
[2]. Irgacure 907, 2-methyl-1-[4-(methylthio)phenyl]-2(4-morpholinyl)-propan-1-one, available from CIBA GEIGY.
[3]. Irgacure 369, 2-benzyl-2-N,N-dimethylamino-1-(4-morpholinophenyl)-butan-1-one, available from CIBA GEIGY.
[4]. Isopropylthioxanthone, available from Biddle-Sawyer Corp., New York, NY.
[5]. Ethyl p-(dimethylamino)benzoate, available from Aldrich Chemical Co., Milwaukee, WI.
[6]. Camphorquinone, available from Hampford Research, Inc., Stratford, CT.
[7]. Diphenyliodonium PF$_6$ salt, prepared as described in Crivello, J. V., Ann. Rev. Mater. Sci., 1983, 13, 1973.
[8]. Tris(trichloromethyl)triazine, prepared as in K. Wakabayashi, M. Tsunoda, and Y. Suzki, Bulletin of the Chemical Society of Japan, Vol 42, 2924–2931, 1969.

TABLE 2

Maximum Cure Speed (Meters/Minute)

| | Lamps | | | |
|---|---|---|---|---|
| Example | "H" Bulb | "V" Bulb | "D" Bulb | "Q" Bulb |
| 1 | 3.1 | 10.7 | 6.1 | 6.1 |
| 2 | >3.1 | 6.1 | 6.1 | 3.1 |
| 3 | — | 3.1 | 3.1 | <3.1 |
| 4 | — | 3.1 | <3.1 | <3.1 |
| 5 | — | 45.7 | 30.5 | 45.7 |
| 6 | — | 30.5 or > | 22.9 | 22.9 or > |
| 7 | — | 6.1 | 10.7 | 3.1 |
| 8 | — | 6.1 | 3.1 | 3.1 |
| 9 | — | 45.7 | 30.5 or > | 30.5 |
| 10 | — | 3.1 | 3.1 | <3.1 |
| 11 | — | 38.1 or > | 22.9 | 30.5 |
| 12 | 6.1 | 45.7 | 22.9 | 10.7 |
| 13 | — | 6.1 | 10.7 | 22.9 |
| 14 | 22.9 or > | 45.7 | 53.3 | 6.1 |
| 15 | — | 38.1 | 15.2 | 45.7 |
| 16 | — | 10.7 | 6.1 | 22.9 |
| 17 | — | 45.7 | 30.5 | 10.7 |
| 18 | — | 10.7 | 10.7 | 30.5 |
| 19 | — | 38.1 or > | 30.5 | 10.9 |

TABLE 3

Comparative Photoinitiator Systems
(Initiator Concentration in Parts per Hundred TATHEIC/TMPTA)

| | Example | | | | | | | | | | | |
|---|---|---|---|---|---|---|---|---|---|---|---|---|
| | C1 | C2 | C3 | C4 | C5 | C6 | C7 | C8 | C9 | C10 | C11 | C12 |
| Irgacure 651[1] | 1.0 | 1.0 | 1.0 | 1.0 | 1.0 | 1.0 | 1.0 | 1.0 | 1.0 | 1.0 | — | — |
| Irgacure 261[2] | — | — | — | — | — | — | — | — | — | — | — | — |
| Irgacure 500[3] | — | — | — | — | — | — | — | — | — | — | — | — |
| Irgacure 784[4] | — | — | — | — | — | — | — | — | — | — | — | — |
| ITX[5] | — | 0.5 | — | 0.5 | — | 0.5 | — | 0.5 | — | 0.5 | .75 | .75 |
| EDMAB[6] | — | 0.5 | — | — | 0.5 | 0.5 | — | — | 0.5 | 0.5 | .75 | .75 |
| CPQ[7] | — | — | — | — | — | — | — | — | — | — | — | — |
| Ph$_2$I$^+$PF$_6^-$[8] | — | — | 0.5 | 0.5 | 0.5 | 0.5 | — | — | — | — | — | 0.5 |
| TRIS[9] | — | — | — | — | — | — | 0.5 | 0.5 | 0.5 | 0.5 | — | — |
| MEK Peroxide[10] | — | — | — | — | — | — | — | — | — | — | — | — |
| t-Amyl Perbenzoate[11] | — | — | — | — | — | — | — | — | — | — | — | — |
| CpFexylene[12] | — | — | — | — | — | — | — | — | — | — | — | — |
| m-mostol[13] | — | — | — | — | — | — | — | — | — | — | — | — |
| p-mostol[14] | — | — | — | — | — | — | — | — | — | — | — | — |

| | Example | | | | | | | | | | | |
|---|---|---|---|---|---|---|---|---|---|---|---|---|
| | C13 | C14 | C15 | C16 | C17 | C18 | C19 | C20 | C21 | C22 | C23 | C24 |
| Irgacure 651[1] | — | — | — | — | — | — | — | — | — | — | — | — |
| Irgacure 261[2] | — | — | — | — | 0.2 | 0.2 | 0.2 | — | — | — | — | — |
| Irgacure 500[3] | — | — | — | — | — | — | — | 1.5 | — | — | — | — |
| Irgacure 784[4] | — | — | — | — | — | — | — | — | 0.2 | — | — | — |
| ITX[5] | — | — | .75 | — | — | — | — | — | — | — | — | — |
| EDMAB[6] | 0.5 | 0.5 | .75 | 0.5 | — | — | — | — | — | — | — | — |
| CPQ[7] | 0.5 | 0.5 | — | 0.5 | — | — | — | — | — | — | — | — |

TABLE 3-continued

Comparative Photoinitiator Systems
(Initiator Concentration in Parts per Hundred TATHEIC/TMPTA)

| | | | | | | | | | | | |
|---|---|---|---|---|---|---|---|---|---|---|---|
| $Ph_2I^+PF_6^-$ [8] | — | 0.5 | .75 | — | — | 0.5 | — | — | — | — | — | — |
| TRIS[9] | — | — | — | 0.5 | — | — | 0.5 | — | — | — | — | — |
| MEK Peroxide[10] | — | — | — | — | 2.0 | — | — | — | — | 2.0 | — | — |
| t-Amyl Perbenzoate[11] | — | — | — | — | — | — | — | — | — | — | 2.0 | — |
| CpFexylene[12] | — | — | — | — | — | — | — | — | — | 0.2 | 0.2 | — |
| m-mostol[13] | — | — | — | — | — | — | — | — | — | — | — | — |
| p-mostol[14] | — | — | — | — | — | — | — | — | — | — | — | 1.0 |

| | Example | | | | | | |
|---|---|---|---|---|---|---|---|
| | C25 | C26 | C27 | C28 | C29 | C30 | C31 |
| Irgacure 651[1] | — | — | — | — | — | — | — |
| Irgacure 261[2] | — | — | — | — | — | — | — |
| Irgacure 500[3] | — | — | — | — | — | — | — |
| Irgacure 784[4] | — | — | — | — | — | — | — |
| ITX[5] | — | 0.5 | 0.5 | — | 0.5 | 0.5 | — |
| EDMAB[6] | — | — | 0.5 | 0.5 | — | 0.5 | 0.5 |
| CPQ[7] | — | — | — | 0.5 | — | — | 0.5 |
| $Ph_2I^+PF_6^-$ [8] | — | — | — | — | — | — | — |
| TRIS[9] | — | — | — | — | — | — | — |
| MEK Peroxide[10] | — | — | — | — | — | — | — |
| t-Amyl Perbenzoate[11] | — | — | — | — | — | — | — |
| CpFexylene[12] | — | — | — | — | — | — | — |
| m-mostol[13] | 1.0 | — | — | — | 1.0 | 1.0 | 1.0 |
| p-mostol[14] | — | 1.0 | 1.0 | 1.0 | — | — | — |

(Footnotes for Table 3.)

[1] Irgacure 651, 2,2-Dimethyl-1,2-diphenyl ethanone, available from CIBA GEIGY, Inc., Hawthorne, NY.
[2] Irgacure 261, (η⁶-methyl ethyl-benzene) (η⁵-cyclopentadienyl) iron(II) hexafluorophosphate, available from CIBA GEIGY.
[3] Irgacure 500, a 50:50 blend of 1-hydroxycyclohexyl phenyl ketone and benzophenone, available from CIBA GEIGY.
[4] Irgacure 784, Bis (pentafluorophenyl) titanocene, available from CIBA GEIGY.
[5] Isopropylthioxanthone, available from Biddle-Sawyer Corp., New York, NY.
[6] Ethyl p-(dimethylamino)benzoate, available from Aldrich Chemical Co. Milwaukee, WI.
[7] Camphorquinone, available from Hampford Research, Inc., Stratford, CT.
[8] Diphenyliodonium $PF_6$ salt, prepared as described in Crivello, J.V., Ann. Rev. Mater. Sci., 1983, 13, 1973.
[9] Tris(trichloromethyl)triazine, prepared as in K. Wakabayashi, M. Tsunoda, and Y. Suzki, Bulletin of the Chemical Society of Japan, Vol 42, 2924–2931, 1969.
[10] Methyl ethyl ketone peroxide, available from Aldrich Chemical Co.
[11] Tert-amyl perbenzoate, available from Akzo Chemical, Inc., Chicago, IL.
[12] (η⁶-xylene) (η⁵-cyclopentadienyl) iron(II) hexafluorophosphate, prepared as described in Keipert, K., U.S. Pat. No. 5,059,701.

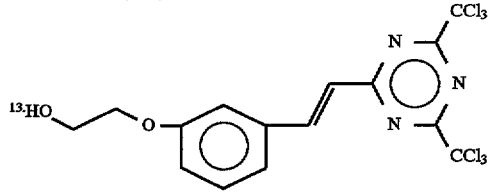

[13] (compound prepared as described in Bonham et al., U.S. Pat. No. 3,987,037.)

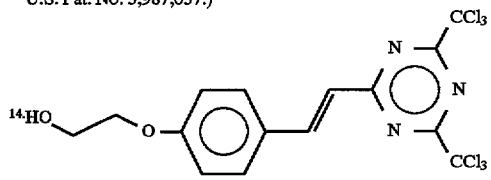

[14] (compound prepared as described in Bonham et al., U.S. Pat. No. 3,987,037.)

TABLE 4

| | Maximum Cure Speed (Meters/Minute) | | | |
|---|---|---|---|---|
| | Lamps | | | |
| Example | "H" Bulb | "V" Bulb | "D" Bulb | "Q" Bulb |
| C1 | <3.1 | <3.1 | <3.1 | <3.1 |
| C2 | — | 3.1 | <<3.1 | <3.1 |
| C3 | — | 3.1 | 6.1 | <3.1 |
| C4 | — | <3.1 | <3.1 | <3.1 |
| C5 | — | 6.1 | 6.1 | <3.1 |
| C6 | — | 6.1 | <3.1 | 3.1 |
| C7 | — | 3.1 | <<3.1 | <3.1 |
| C8 | — | <<3.1 | 8.1 | <3.1 |
| C9 | — | 3.1 | <3.1 | <<3.1 |
| C10 | — | 3.1 | <3.1 | <3.1 |
| C11 | — | <<3.1 | <3.1 | <3.1 |
| C12 | — | 3.1 | 3.1 | <3.1 |
| C13 | 22.9 | 45.7 | 30.5 or > | 45.7 |
| C14 | 15.2 | 53.3 | 22.9 | 38.1 |
| C15 | — | 6.1 | 3.1 | <3.1 |
| C16 | — | 30.5 | 30.5 or > | 45.7 |
| C17 | — | 3.1 | 3.1 | <6.1 |
| C18 | — | <3.1 | <3.1 | — |
| C19 | — | 3.1 | 3.1 | — |
| C20 | — | <3.1 | <3.1 | — |
| C21 | — | 3.1 | 6.1 | <6.1 |
| C22 | — | 3.1 | 3.1 | <6.1 |
| C23 | — | 10.7 | 10.7 | — |
| C24 | — | <3.1 | <3.1 | <6.1 |
| C25 | — | <3.1 | <3.1 | <6.1 |
| C26 | — | <3.1 | <3.1 | — |
| C27 | — | <3.1 | <3.1 | — |
| C28 | — | 6.1 | 6.1 | — |
| C29 | — | <3.1 | <3.1 | — |
| C30 | — | <3.1 | <3.1 | — |
| C31 | — | 6.1 | 10.7 | — |

Among Examples 1–19, those employing the photoinitiator known under the trade designation "Irgacure 369" (Examples 12, 14, 15, 17, and 19 were particularly effective in achieving through cure at higher webs speeds (38 m/minute or greater) with the "V" bulb. Photoinitiator systems comprising isopropylxanthone (ITX) and Irgacure 369 (Examples 13, 16, and 18) exhibited through cure only at decreased webs speeds with the "V" bulbs compared with initiator systems having no ITX present, although reasonable web speeds were achieved when curing with "Q" bulbs.

EXAMPLES 20–26

Abrasive articles were prepared using the composition of Example 12. The slurry was extruded onto a nickel production tool having an asymmetric square pyramidal pattern using a vacuum coater die with the process described in Examples 15–16 of U.S. Pat. No. 5,152,917 (Pieper et al.), which is incorporated herein by reference. The pattern of the production tool had the edges of the bases of the pyramids, each 0.89 mm in length, abutted against one another. The apex of the pyramid was 0.53 mm above the plane of the base and was offset from a normal position perpendicular to the intersection of two lines bisecting opposite corners of the pyramid base to a position such that each face of the pyramid had different dimensions and made different angles with the base of the pyramid. The face angles with the base were 7.9°, 56.8°, 30.9°, and 46.9°.

Immediately after extruding the slurry onto the production tool, with or without a vacuum applied to the vacuum die coater, a clear poly(ethylene terephthalate) (PET) film 127 micrometers thick (5 mils) which had been coated on one surface with an ethylene acrylic acid copolymer primer known under the trade designation "Primacor 3330", available from Dow Chemical Co., Midland, Mich. was pressed against the production tool (primed side to slurry) and the resulting construction cured by exposure to two 300 watt/2.54 "H" bulbs in a nitrogen inerted web processor for the indicated times. Cut performance of the abrasive articles, as measured in the robot grinding test described above, is reported in Table 5.

COMPARATIVE EXAMPLES C32–C33

An abrasive article was prepared according to the procedure of Examples 20–26, using the composition of Example 12, except that 2 parts of the photoinitiator known under the trade designation "Irgacure 651" per 100 parts TATHEIC/TMPTA were used instead of 1 part photoinitiator known under the trade designation "Irgacure 369" per 100 parts TATHEIC/TMPTA. Cut performance of the abrasive articles, as measured in the robot grinding test as described above, is reported in Table 5. The most striking aspect of this performance evaluation was in the initial cut performance, where the cut dropped monotonically from 8.0 to 6.3 gms. as the web cure speed was raised from about 3.1 meters/minute to 9.1 meters/minute for the abrasive articles of the present invention as compared to the cut of comparative abrasive articles which decreased from 6.5 gms. when cured at 4.6 meters per minute to only 1.4 gms. when cured at 7.3 meters per minute.

TABLE 5

| | Robot Belt Cut Test Performance | | | | | | | | |
|---|---|---|---|---|---|---|---|---|---|
| Example | 20 | 21 | 22 | 23 | 24 | 25 | 26 | C32 | C33 |
| Vacuum (On/Off) | On | On | On | On | On | Off | Off | On | On |
| Cure Speed (M/min) | 3.1 | 5.5 | 7.3 | 7.9 | 9.1 | 3.1 | 4.65 | 4.6 | 7.3 |
| Initial Cut (gms) | 8.0 | 7.5 | 6.5 6.8 | 6.4 | 6.3 | 8.2 | 6.2 | 6.5 | 1.4 |
| Final Cut (gms) | 8.4 | 8.8 | 8.1 8.1 | 8.2 | 8.4 | 8.0 | 8.6 | 8.8 | 8.3 |
| Total Cut (gms) | 82.4 | 72.5 | 79.4 86.5 | 80.4 | 84.0 | 92.0 | 97.2 | 87.5 | 83.7 |
| Time (minutes) | 9 | 8.25 | 9.5 10.0 | 9.75 | 9.75 | 10.25 | 11.5 | 10.25 | 12.25 |

EXAMPLES 27-29

Abrasive articles were prepared from the basic slurry composition of Examples 20–26 except that a portion of the 40 micrometer white aluminum oxide was replaced by an amorphous silica filler (known under the trade designation "OX-50", available from Degussa Corp., Ridgefield Park, N.J.) and/or cryolite (a grinding aid, available from Washington Mills, North Grafton, Mass.) as indicated in Table 6. The abrasive articles were prepared by pouring a bead of the slurry on a flat production tool having the same pattern as the production tool used in Examples 20–26, placing the primed face of a piece of a PET film 127 micrometers (5 mils) thick (same film as used in Examples 20–26) against the production tool, and pushing against the back side of the PET film with a plastic blade to spread the slurry over the tool while forcing entrapped air bubbles out of the laminate construction. The thus formed sandwich constructions were taped to metal platens with the PET film facing upward, the pattern run through a nitrogen inerted web processor equipped with a 600 watt/2.54 cm "V" bulb at a distance of 5.1 cm (2 inches) from the light source and at the web speeds indicated in Table 6. Abrasive performance of the articles was characterized using the previously described slide action disk test (Test Procedure III) and the performance data for the articles is presented in Table 6.

COMPARATIVE EXAMPLES C34–C36

Abrasive articles were prepared according to the procedure of Examples 27–29 except that in the slurries of Comparative Examples C32–C33, a portion of the 40 micrometer white aluminum oxide was replaced by an amorphous silica filler known under the trade designation "OX-50" (Degussa Corp., Ridgefield Park, N.J., having average particle size of 40 millimicrometers, surface area of 50 m²/g) and/or cryolite, a grinding aid, as indicated in Table 6. Abrasive performance of the articles was characterized using the previously described slide action disk test. The performance data for the articles is presented in Table 6.

TABLE 6

Slurry Compositions and Abrasive Article Performance Data

| Example | 27 | 28 | 29 | C34 | C35* | C36 |
|---|---|---|---|---|---|---|
| % OX-50 | 0 | 0 | 1.0 | 0 | 0 | 1.0 |
| % cryolite | 0 | 0 | 5.0 | 0 | 0 | 5.0 |
| Web Speed (m/min) | 3.1 | 9.1 | 3.1 | 3.1 | 9.1 | 3.1 |
| Initial Cut* | 3.03 | 2.75 | 3.18 | 2.60 | 2.10 | 2.75 |
| Final Cut* | 0.88 | 0.77 | 0.60 | 0.75 | 0.40 | 0.67 |
| Total Cut* | 9.03 | 10.35 | 8.50 | 5.73 | 5.33 | 7.73 |
| Time(minutes) | 2.38 | 3.00 | 2.25 | 1.75 | 2.00 | 2.17 |

*Cut data is the average of 3 discs.

Abrasive articles prepared from the compositions of the present invention gave higher initial and total cuts than abrasive articles having the same basic composition but utilizing a different photoinitiator.

EXAMPLES 30–31

A slurry was prepared by combining a mixture consisting of 32 grams of a mixture consisting of a mixture of TATHEIC/TMPTA/Irgacure 369 (50/50/2), 40.98 grams of a mixture consisting of 100 parts tetrahydrofurfuryl acrylate (available from Sartomer, Co.) and 2 parts 2-benzyl-2-N,N-dimethylamino-1-(4-morpholinophenyl)-butan-1-one ("Irgacure 369", and 170 grams of a mixture consisting of 144.5 grams white aluminum oxide ("WA 2000", available from Fujimi Corp., Elmhurst, Ill.)/23.5 grams clay ("Peerless #4", available from R. T. Vanderbilt Co., Inc., Norwalk, Conn.)/2.0 grams 3-methylacryloylpropyltrimethoxysilane (known under the trade designation "A-174", available from Union Carbide Corp., Danbury, Conn.) and mixing until a uniform mixture was obtained. An abrasive article was prepared from this slurry according to the procedure of U.S. Pat. No. 5,152,917 (Pieper et al.), which was previously incorporated herein by reference. The nickel production tool had an asymmetric triangular pyramidal pattern with two of the base edges being about 128.5 micrometers in length and the other edge being about 143 micrometers in length, with the base edges being abutted against one another. The height of the pyramid was about 63.5 micrometers. The PET film used in the construction was approximately 130 micrometers thick and had one face primed with an approximately 20 micrometer thick ethylene acrylic acid copolymer primer. A sandwich construction was prepared by introducing a bead of the adhesive slurry on the production tool, placing the PET film over the abrasive slurry, primed face toward the tool, and using a plastic blade to push the abrasive slurry over the tool such that the structured pattern of the tool was wet out and filled by the slurry. The thus formed sandwich construction was taped to a metal pattern with the PET film facing upward, the pattern passed through a web processor twice to produce the abrasive article. The web processor was equipped with a 600 watt/2.54 cm "V" bulb (Example 30) or a 600 watt/2.54 cm "D" bulb (Example 31), the web was 5.1 cm (2 inches) from the light source and the web speed was about 60 meters per minute. Abrasive performance of the articles was characterized using the previously described Schiefer Cut test and the performance data for the articles is presented in Table 7. Cut data is the average of two discs.

EXAMPLES 32–33

The procedure of Examples 30–31 was followed except that the slurry was prepared by combining a mixture consisting of 32 grams of a mixture consisting of a mixture of 50 parts TATHEIC, 50 parts TMPTA, and 2 parts of the photoinitiator 2-methyl-1-[4-(methylthio)phenyl]-2-morpholinopropan-1-one (known under the trade designation "Irgacure 907"), 40.98 grams of a mixture consisting of 100 parts tetrahydrofurfuryl (THF) acrylate and 2 parts of the photoinitiator "Irgacure 907" and 170 grams of a mixture consisting of 144.5 grams white aluminum oxide "WA 2000", 23.5 grams clay ("Peerless #4) and 2.0 parts γ-methylacryloylpropyltrimethoxysilane coupling agent known under the trade designation "A-174" (Union Carbide) and mixing until a uniform mixture was obtained. Example 32 was cured using a "V" bulb while Example 33 was cured using a "D" bulb. Cut performance data for the abrasive articles, which is the average of two discs, is reported in Table 7.

EXAMPLES 34–35

The procedure of Examples 30–31 was followed except that the slurry was prepared by blending a mixture consisting of 32 grams of a mixture consisting of 50 parts TATHEIC, 50 parts TMPTA, and 3 parts photoinitiator system consisting of 2 parts photoinitiator known as "Irgacure 907" and 1 part ITX, 40.98 grams of a mixture consisting of 100 parts tetrahydrofurfuryl (THF) acrylate and 3 parts photoinitiator system consisting of 2 parts photoinitiator known under the trade designation "Irgacure 907" and 1 part ITX, and 170 grams of a mixture consisting of 144.5 grams white aluminum oxide "WA 2000", 23.5 grams clay ("Peerless #4) and 2.0 parts γ-methylacryloylpropyltrimethoxysilane coupling agent known under the trade designation "A-174" (Union Carbide) and mixing until a uniform mixture was obtained. Example 34 was cured using a "V" bulb while Example 35 was cured using a "D" bulb. Cut performance data for the abrasive articles, which was the average of two discs, is reported in Table 7.

COMPARATIVE EXAMPLES C37–C38

The procedure of Examples 30–31 was followed except that the slurry was prepared by combining a mixture consisting of 32 grams of a mixture consisting of a mixture of 50 parts TATHEIC, 50 parts TMPTA, and 2 parts of the photoinitiator 2,2-dimethyl-1,2-diphenyl ethanone (known under the trade designation "Irgacure 651"), 40.98 grams of a mixture consisting of 100 parts tetrahydrofurfuryl (THF) acrylate and 2 parts photoinitiator known under the trade designation "Irgacure 651"), and 170 grams of a mixture consisting of 144.5 grams white aluminum oxide "WA 2000", 23.5 grams clay ("Peerless #4) and 2.0 parts γ-methylacryloylpropyltrimethoxysilane coupling agent known under the trade designation "A-174" (Union Carbide) with mixing until a uniform mixture was obtained. Comparative Example C37 was cured using a "V" bulb while Comparative Example C38 was cured using a "D" bulb. Cut performance data using the Schiefer Cut Test for the abrasive articles, which was the average of two discs, is reported in Table 7.

TABLE 7

| Schiefer Cut Test Data | | | |
| --- | --- | --- | --- |
| Example | Photoinitiator | Bulb | Cut (gms) |
| 30 | Irgacure 369 | "V" | 0.382 ± 0.023 |
| 31 | Irgacure 369 | "D" | 0.400 ± 0.001 |
| 32 | Irgacure 907 | "V" | 0.218 ± 0.017 |
| 33 | Irgacure 907 | "D" | 0.304 ± 0.001 |
| 34 | Irgacure 907/ITX | "V" | 0.409 ± 0.003 |
| 35 | Irgacure 907/ITX | "D" | 0.471 ± 0.022 |
| C37 | Irgacure 651 | "V" | Slurry adhered to tool |
| C38 | Irgacure 651 | "D" | Slurry adhered to tool |

The data in Table 7 illustrates that photoinitiator systems of the invention (Examples 30–35) allow at least enough cure so that the film backing/abrasive composite may be removed from the production tool, whereas the photoinitiator known under the trade designation "Irgacure 651" (Comparative Examples 37 and 38) does not allow cure to proceed well enough to allow this separation. The optimal combination of photoinitiator system and bulb type is the system comprising the photoinitiator known under the trade designation "Irgacure 907" combined with ITX, using the "D" bulbs.

EXAMPLES 36–40

Coated abrasive articles were prepared using a make coat/size coat procedure similar to that used in the manufacture of conventional photo cured coated abrasive products. The articles were prepared by coating a make coating onto a PET film (76 micrometers thick) that had previously been primed with an ethylene acrylic acid copolymer primer. Immediately after the make coating had been applied to the PET film, P-120 fused aluminum oxide abrasive grits (known under the trade designation "F#X", available from Treibacher Chemische Werke AG, Treibach-Althoten, Austria, having an average particle size of about 120 micrometers) were electrostatically projected into the make coating and the resulting construction cured by passing the web through a nitrogen inerted web processor equipped with a Fusion Systems ultraviolet "D" lamp operating at 300 watts/2.54 cm. The web was passed though the processor at a rate of approximately 4.5 meters per minute. A size coating was then applied to the cured construction using a roll coater and the construction passed through the web processor a second time at a rate of about 6.1 meters per minute to cure the size coating. After the coated abrasive articles had been cured, they were heated to 104° C. for 45 minutes to activate the primer. In all cases, the make coating consisted of a 35/50 percent by weight calcium carbonate filler/binder mixture while the size coating consisted of a 50/50 percent by weight calcium carbonate/binder mixture. The binder compositions are described in Table 8, the make coating/ abrasive grit loading/size coating construction of the abrasive articles and the abrasive performance data, as determined by the previously described Robot Grinding test, are reported in Table 9. Additionally, the surface finish $R_a$ was measured after the initial cut of 1 minute, after 10 minutes, and after twenty minutes of grinding.

TABLE 8

| Coated Abrasive Binder Compositions | | | | | |
| --- | --- | --- | --- | --- | --- |
| Example | 36 | 37 | 38 | 39 | 40 |
| TATHEIC (gms) | 400 | — | — | — | 400 |
| PETA[1] (gms) | — | 400 | — | 400 | — |
| TMPTA (gms) | — | — | 400 | — | 400 |
| HEA[2] (gms) | 400 | 400 | 400 | — | — |
| HEMA[3] (gms) | — | — | — | 400 | — |
| Irgacure 369 (gms) | 8 | 8 | 8 | 8 | 8 |
| EMAB[4] (gms) | 12 | 12 | 12 | 12 | 12 |
| Benzophenone[5] (gms) | 12 | 12 | 12 | 12 | 12 |
| A-174 (gms) | 12 | 12 | 12 | 12 | 12 |

[1]Pentaerythritol triacrylate, available from Sartomer Co.
[2]Hydroxyethyl acrylate, available from Aldrich Chemical Co., Milwaukee, WI.
[3]Hydroxyethyl methacrylate, available from Aldrich Chemical Co.
[4]4-N,N-dimethylaminoethyl benzoate, available from Aldrich Chemical Co.
[5]Benzophenone, available from Aldrich Chemical Co.

TABLE 9

| Make Coat/Grit Loading/Size Coat Descriptions and Abrasive Cut Performance Data | | | | | |
| --- | --- | --- | --- | --- | --- |
| Example | 36 | 37 | 38 | 39 | 40 |
| Make Coat (gms/m²) | 37 | 45 | 45 | 43 | 44 |
| Abrasive Load (gms/m²) | 193 | 201 | 197 | 198 | 214 |
| Size Coat (gms/m²) | 121 | 114 | 108 | 100 | 134 |
| Initial Cut (gms) | 31.5 | 27.5 | 27.0 | 29.7 | 28.25 |
| Final Cut (gms) | 21.5 | 19.9 | 19.6 | 21.3 | 20.7 |
| Total Cut (gms) | 480.7 | 434.7 | 424.6 | 468.5 | 460.5 |
| $R_a$ | | | | | |
| (1 min.) | 79.3 | 91.0 | 86.7 | 99.5 | 85.7 |

TABLE 9-continued

Make Coat/Grit Loading/Size Coat Descriptions and Abrasive Cut Performance Data

| Example | 36 | 37 | 38 | 39 | 40 |
|---|---|---|---|---|---|
| (10 min.) | 58.7 | 64.3 | 62.8 | 64.0 | 73.2 |
| (20 min.) | 58.0 | 56.3 | 52.8 | 61.0 | 61.3 |

EXAMPLES 41–42

Three-dimensional nonwoven abrasive discs were prepared which had size coats based on photocured resin systems comprising a blend of 50 parts neopentyl glycol diacrylate, 50 parts TMPTA and 1 part photoinitiator known under the trade designation "Irgacure 369". The discs were prepared by spray applying 25 gm of the size coating resin, to which had been added benzophenone (0.5 gms) and N,N-dimethylethyl benzoate (0.5 gms) onto each of four 17.8 cm diameter (7 inch) unsized discs cut from the unsized webs, prepared as described in U.S. Pat. No. 3,688,453 (Legacy et al.), which is incorporated herein by reference. The discs of Example 41 were cured in two passes through a nitrogen inerted web processor equipped with one 600 watt/2.54 cm Fusion Systems "V" ultraviolet lamp, passing the discs 5.1 cm from the bulb at a rate of about 7.6 m/min (25 ft/min) while the discs of Example 42 were cured in two passes through the same processor at a rate of about 30.5 m/min (100 ft/min). Subsequent to photocuring, the discs were cured for 20 minutes at 121° C. in a circulating air oven to provide the size coat add-ons indicated in Table 10. The abrasive performance of the nonwoven abrasive articles was characterized using the previously described Disc Cut Test. The cut data is shown in Table 10.

COMPARATIVE EXAMPLES C39–C40

Comparative three-dimensional nonwoven abrasive discs were prepared according to the procedure of Examples 41–42 except that the photoinitiator known under the trade designation "Irgacure 651" replaced that known under the trade designation "Irgacure 369" in the size coating resin formulation. The discs of Comparative Example C39 were cured in two passes through the web processor at a rate of about 7.6 m/min (25 ft/min) while the discs of Comparative Example C40 were cured in two passes through the web processor at a rate of about 30.5 m/min (100 ft/min).

TABLE 10

Three-Dimensional Nonwoven Abrasive Articles

| Example | Disc Wt. Before Spray (gms) | Disc Wt. After Heat (gms) | Disc Wt. After Test (gms) | Total Cut (gms) |
|---|---|---|---|---|
| 41 | 47.55 | 49.24 | 36.2 | 1.83 |
| 41 | 49.74 | 51.71 | 39.74 | 1.8 |
| 42 | 48.38 | 50.18 | 39.18 | 1.99 |
| 42 | 48.62 | 50.22 | 35.95 | 1.54 |
| C39 | 48.6 | 50.4 | 38.29 | 1.86 |
| C39 | 48.74 | 50.4 | 35.91 | 1.66 |
| C40 | 48.08 | 49.36 | 36.1 | 1.73 |
| C40 | 48.7 | 50.43 | 36.4 | 1.67 |

Examples 41–42 and Comparative Examples C39–C40 illustrated that useful nonwoven abrasives can be made using a photoinitiator system which includes a compound having molar absorptivity in dilute methanol solution ranging from about 4 to about 400 liter/mole-cm in at least some portion of the UV/visible spectrum ranging from about 395 nanometers to about 500 nanometers.

The following examples demonstrate the effect of different lamps, cure speeds, polymeric colorants and photoinitiator systems on the cure level of the binder and the adhesion of the binder to the backing.

COMPARATIVE EXAMPLES C41a–C41e

Comparative Example C41a consisted of a slurry of 40 micrometer white aluminum oxide (69 parts), amorphous silica known under the trade designation "OX-50" (1 part), coupling agent known under the trade designation "A-174" (1 part), resin (29 parts of a blend consisting of 50 parts TATHEIC, 50 parts TMPTA, and 1 part photoinitiator known under the trade designation "Darocur 1173"). This coatable composition was coated according to the procedure of Examples 30–31 except that a polypropylene production tool having an asymmetric triangular pyramidal pattern, 0.53 mm in height, having two of the base edges being about 1.06 mm in length and the other edge being 1.18 mm in length, with the base edges abutted against one another, was used. Coating and curing conditions were generally the same as those used in Examples 30–32 with the exception that light sources and cure speeds were varied as described below.

Comparative Example C41b was prepared according to the procedure of Comparative Example C41a except that 0.3 part of a blue polymeric colorant available from Milliken Corp., Spartanburg, S.C., known under the trade designation "Reactint Blue X 17AB" was added to the slurry.

Comparative Example C41c was prepared according to the procedure of Comparative Example C41a except that 0.3 part of a yellow polymeric colorant known under the trade designation "Reactint Yellow X15", available from Milliken Corp., was added to the slurry.

Comparative Example C41d was prepared according to the procedure of Comparative Example C41a except that 0.3 part of a red polymeric colorant, available from Milliken Corp. under the trade designation "Reactint Red X52" was added to the slurry.

Comparative Example C41e was prepared according to the procedure of Comparative Example C41a except that 0.3 part of an orange polymeric colorant, available from Milliken Corp. under the trade designation "Reactint Orange X38", was added to the slurry.

COMPARATIVE EXAMPLES C42a–C42e

Comparative Example C42a was prepared according to the procedure of Comparative Example C41a except that the resin was a blend consisting of 50 parts TATHEIC, 50 parts TMPTA, and 1 part photoinitiator known under trade designation "Irgacure 651".

Comparative Example C42b was prepared according to the procedure of Comparative Example C42a except that 0.3 part of the blue polymeric colorant known under the trade designation "Reactint Blue X17AB" was added to the slurry.

Comparative Example C42c was prepared according to the procedure of Comparative Example C42a except that 0.3 part of the yellow polymeric colorant known under the trade designation "Reactint Yellow X15" was added to the slurry.

Comparative Example C42d was prepared according to the procedure of Comparative Example C42a except that 0.3 part of the red polymeric colorant known under the trade designation "Reactint Red X52" was added to the slurry.

Comparative Example C42e was prepared according to the procedure of Comparative Example C42a except that 0.3 part of the orange polymeric colorant known under the trade designation "Reactint Orange X38" was added to the slurry.

EXAMPLES 43a–43e

Example 43a was prepared according to the procedure of Comparative Example C41a except that the resin was a blend consisting of 50 parts TATHEIC, 50 parts TMPTA, 1.0 part of the photoinitiator known under the trade designation "Irgacure 907", and 0.5 part ITX.

Example 43b was prepared according to the procedure of Example 43a except that 0.3 part of a blue polymeric colorant known under the trade designation "Reactint Blue X17AB" was added to the slurry.

Example 43c was prepared according to the procedure of Example 43a except that 0.3 part of the yellow polymeric colorant known under the trade designation "Reactint Yellow X15" was added to the slurry.

Example 43d was prepared according to the procedure of Example 43a except that 0.3 part of the red polymeric colorant known under the trade designation "Reactint Red X52" was added to the slurry.

Example 43e was prepared according to the procedure of Example 43a except that 0.3 part of the orange polymeric colorant known under the trade designation "Reactint Orange X38" was added to the slurry.

EXAMPLES 44a–44e

Example 44a was prepared according to the procedure of Comparative Example C41a except that the resin was a blend consisting of 50 parts TATHEIC, 50 parts TMPTA, and 1 part photoinitiator known under the trade designation "DAROCUR 4265".

Example 44b was prepared according to the procedure of Example 44a except that 0.3 part of a blue polymeric colorant known under the trade designation "Reactint Blue X17AB" was added to the slurry.

Example 44c was prepared according to the procedure of Example 44a except that 0.3 part of the yellow polymeric colorant known under the trade designation "Reactint Yellow X15" was added to the slurry.

Example 44d was prepared according to the procedure of Example 44a except that 0.3 part of the red polymeric colorant known under the trade designation "Reactint Red X52" was added to the slurry.

Example 44e was prepared according to the procedure of Example 44a except that 0.3 part of the orange polymeric colorant known under the trade designation "Reactint Orange X38" was added to the slurry.

EXAMPLES 45a–45e

Example 45a was prepared according to the procedure of Comparative Example C41a except that the resin was a blend consisting of 50 parts TATHEIC, 50 parts TMPTA, and 1 part photoinitiator known under the trade designation "Irgacure 369".

Example 45b was prepared according to the procedure of Example 45a except that 0.3 part of a blue polymeric colorant known under the trade designation "Reactint Blue X17AB" was added to the slurry.

Example 45c was prepared according to the procedure of Example 45a except that 0.3 part of the yellow polymeric colorant known under the trade designation "Reactint Yellow X15" was added to the slurry.

Example 45d was prepared according to the procedure of Example 45a except that 0.3 part of the red polymeric colorant known under the trade designation "Reactint Red X52" was added to the slurry.

Example 45e was prepared according to the procedure of Example 45a except that 0.3 part of the orange polymeric colorant known under the trade designation "Reactint Orange X38" was added to the slurry.

EXAMPLES 46a–46e

Example 46a was prepared according to the procedure of Comparative Example C41a except that the resin was a blend consisting of 50 parts TATHEIC, 50 parts TMPTA, and 1 part diphenyl 2,4,6-trimethyl benzoylphosphine oxide (TPO).

Example 46b was prepared according to the procedure of Example 46a except that 0.3 part of a blue polymeric colorant known under the trade designation "Reactint Blue X17AB" was added to the slurry.

Example 46c was prepared according to the procedure of Example 46a except that 0.3 part of the yellow polymeric colorant known under the trade designation "Reactint Yellow X15" was added to the slurry.

Example 46d was prepared according to the procedure of Example 46a except that 0.3 part of the red polymeric colorant known under the trade designation "Reactint Red X52" was added to the slurry.

Example 46e was prepared according to the procedure of Example 46a except that 0.3 part of the orange polymeric colorant known under the trade designation "Reactint Orange X38" was added to the slurry.

The binder precursors were cured by passing the tool/slurry/backing laminate under nine cure conditions, using a 600 watt/2.54 cm "V" bulb, a 600 watt/2.54 cm "H" bulb, or a 600 watt/2.54 cm "D" bulb and web speeds of 15.2 m/min (50 ft/min), 30.5 m/min (100 ft/min), or 61 m/min (200 ft/min). All slurries were initially cured at a web speed of 15.2 m/min and if the cure or adhesion value for that cure speed was judged to have the lowest value of the rating scales described below, subsequent cures at higher web speeds were not run.

Subsequent to being passed under the light source, the cure of each sample was qualitatively determined by rubbing the cured slurry with a gloved finger or a tongue depressor and noting if any smearing occurred. The cure was assigned a value from 1 to 3, where a value of 1 indicated significant smearing or a poor cure, a value of 2 indicated some smearing or an intermediate cure and a value of 3 indicated no smearing or a good cure. Similarly, the adhesion of the binder to the backing was qualitatively determined by initially observing the release of the composite from the production tool and then the subsequent adhesion of the cured slurry to the backing as the composite structure was flexed. The adhesion was assigned a value from 1 to 5, where a value of 1 indicated that a major portion of the "cured slurry" adhered to the production tool, a value of 2 indicated that there were some areas where the "cured slurry" adhered to the production tool, a value of 3 indicated no adhesion to the production tool but poor adhesion to the backing as evidenced by large areas of the "cured slurry" flaking off the backing during flexing, a value of 4 indicated no adhesion to the production tool and small areas of the "cured slurry" flaking off the backing on flexing, and a value of 5 indicated no adhesion to the production tool and no loss of the "cured slurry" on flexing.

An incomplete analysis of variance, reflecting that not all samples were cured at all web speeds, using a generalized linear model, looking only at main effects and two-way interactions with the assumption that higher order (>3) interactions were zero, was carried out on the collected data, the results of which are reported in Tables 11–14 below (average of six samples).

TABLE 11

Incomplete Variance Analysis
Adhesion vs Initiator (All Lamps)

| Example | C41 Series | C42 Series | 43 Series | 44 Series | 45 Series | 46 Series |
|---|---|---|---|---|---|---|
| Initiator | Darocur 1173 | Irgacure 651 | Irgacure 907/ITX | Irgacure 4265 | Irgacure 369 | TPO |
| Mean Adhesion | 2.039 | 2.552 | 2.875 | 3.378 | 3.243 | 3.499 |
| Std. Deviation | 0.12710 | 0.11642 | 0.11247 | 0.09200 | 0.09348 | 0.09343 |

TABLE 12

Incomplete Variance Analysis
Adhesion vs Initiator ("V" Bulb Only)

| Example | C41 Series | C42 Series | 43 Series | 44 Series | 45 Series | 46 Series |
|---|---|---|---|---|---|---|
| Initiator | Darocur 1173 | Irgacure 651 | Irgacure 907/ITX | Irgacure 4265 | Irgacure 369 | TPO |
| Mean Adhesion | 2.067 | 2.200 | 3.026 | 3.067 | 3.067 | 3.497 |
| Std. Deviation | 0.15934 | 0.15934 | 0.16767 | 0.15934 | 0.15934 | 0.16667 |

TABLE 13

Incomplete Variance Analysis
Cure vs Initiator (All Lamps)

| Example | C41 Series | C42 Series | 43 Series | 44 Series | 45 Series | 46 Series |
|---|---|---|---|---|---|---|
| Initiator | Darocur 1173 | Irgacure 651 | Irgacure 907/ITX | Irgacure 4265 | Irgacure 369 | TPO |
| Mean Adhesion | 1.2290 | 1.6660 | 1.8936 | 2.5111 | 2.6235 | 2.4170 |
| Std. Deviation | 0.09117 | 0.08351 | 0.08067 | 0.0659 | 0.06705 | 0.06701 |

TABLE 14

Incomplete Variance Analysis
Cure vs Initiator ("V" Bulb Only)

| Example | C41 Series | C42 Series | 43 Series | 44 Series | 45 Series | 46 Series |
|---|---|---|---|---|---|---|
| Initiator | Darocur 1173 | Irgacure 651 | Irgacure 907/ITX | Irgacure 4265 | Irgacure 369 | TPO |
| Mean Adhesion | 1.5333 | 2.2000 | 2.5314 | 2.8667 | 2.7333 | 2.4510 |
| Std. Deviation | 0.11429 | 0.11429 | 0.12027 | 0.11429 | 0.11429 | 0.11955 |

The data in Tables 11–14 indicated the following trends:
1) The cured slurries of Examples 43–46 showed better adhesion to the backing than the cured slurries of Comparative Examples C41–C42 under all cure conditions;
2) Considering the adhesion of slurries cured with the "V" bulb, the adhesion of the cured slurries of Examples 43–46 were much higher than the adhesion of the cured slurries of Comparative Examples C42—C42.
3) The cured slurries of Examples 43–46 showed better "cure" than the cured slurries of Comparative Examples C41–C42 under all cure conditions; and
4) Considering the "cure" of slurries cured with the "V" bulb, the "cure" of Examples 43–46 were much higher than the "cure" of Comparative Examples C42—C42.

EXAMPLES 47–50 AND COMPARATIVE EXAMPLE C47

These examples demonstrated the ability to coat and cure compositions within the invention having different mineral types (colors) therein, and demonstrated the cut performance of the articles.

Examples 47–50, respectively, utilized coatable compositions consisting of 20.7 kilograms (kg) abrasive mineral (type as indicated in Table 15), 0.3 kg amorphous silica known under the trade designation "OX-50", 0.3 kg coupling agent known under the trade designation "A-174", and 8.7 kg resin (70 parts TMPTA, 30 parts TATHEIC, 1 part photoinitiator known under the trade designation "Irgacure 369". These coatable compositions were coated onto a 7 mil (0.179 mm) polypropylene diamond grade production tool having an asymmetric triangular pyramidal pattern, 0.53 mm in height, having two of the base edges being about 1.06 mm in length and the other edge being 1.18 mm in length, with the base edges abutted against one another. The coatable compositions were mixed with a high shear mixer and knife coated onto the polypropylene tooling. The backing used for each of Examples 47–50 and Comparative Example C47 was a rayon cloth backing treated with a phenolic/latex presize resin. The tooling mandrel (location where the product was cured and transferred to the cloth backing) was heated to 45° C. One 600 watt/2.54 cm "V" Fusion Systems lamp was used in each case to cure the compositions, at a run speed of 50–75 feet per minute. The products were then post cured at 112° C. for 14 hours to more completely cure the phenolic presize.

The type of abrasive used in each example and the cut data are tabulated in Table 15. Test Procedure II was utilized for grinding, except that for 1018 stainless steel and 4150 tool steel the belt was run at 1750 RPM, and for 304 stainless steel the belt was run at 1500 RPM, all with a 65 Shore A durometer rubber contact wheel. For grinding brass the belts were run at 1500 RPM against at 45 Shore A durometer rubber contact wheel, and the brass was run only for 10 minutes, not to an endpoint. The initial reading was taken after 30 seconds for all of Examples 47–50 and Comparative Example C47 (rather than after 1 minute), and the endpoint was when the cut for the test belt was only ⅓ that of the initial cut of the belt of Comparative Example C47, or upon burning of the belt, for all workpieces except brass.

From the data in Table 15 it can be seen that improvement in cut performance was achieved on different metal substrates when using colored minerals compared with white aluminum oxide, which allows easy cure of addition polymerizable resins with UV radiation in comparison to utilization of colored minerals. The advantage of using the photoinitiator "Irgacure 369" is evident.

TABLE 15

| Mineral Type | 1018 s.s. Init. Cut (g) | 1018 s.s. Tot. Cut (g) | 304 s.s. Init. Cut (g) | 304 s.s. Tot. Cut (g) | 4150 s.s. Init. Cut (g) | 4150 s.s. Tot. Cut (g) | brass Init. Cut (g) | brass Tot. Cut (g) | Ex No. |
|---|---|---|---|---|---|---|---|---|---|
| 40 mic WAO[1] | 10.7 | 82.5 | 5.4 | 46.5 | 9.9 | 117.6 | 12.6 | 164.8 | 47 |
| P-320 F7TX[2] | 16.5 | 199.4 | 7.2 | 58.1 | 15.0 | 234.5 | 16.1 | 267.8 | 48 |
| P-320 FSX[3] | 16.0 | 87 | 7.5 | 61.5 | 13.8 | 162.3 | 19.2 | 258.5 | 49 |
| P-320 MEM[4] | 15.6 | 156.1 | 7.9 | 62.5 | 14.5 | 194.8 | 19.2 | 257.7 | 50 |
| 201E[5] | 16.7 | 153.3 | 9.8 | 76.9 | 15.2 | 156.8 | 19.5 | 237 | C47 |

[1] 40 micrometer average particle size white aluminum oxide.
[2] 34.3 micrometer average particle size heat treated aluminum oxide (gray), available from Starck GmbH & Co., Berlin, Germany, under the trade designation "F7TX".
[3] 34.3 micrometer average particle size heat treated aluminum oxide (brown), available from Starck GmbH & Co., Berlin, Germany, under the trade designation "FSX".
[4] 34.3 micrometer average particle size seeded aluminum oxided (blue) available under the trade designation "Cubitron 321", from Minnesota Mining and Manufacturing Co., St. Paul, MN (3M).
[5] Standard coated abrasive using phenolic make/size construction, available from 3M under the trade designation "Tri-M-ite" grade 201E, employing P-320 grade (average particle size 34.3 micrometers) heat treated aluminum oxide (gray) (Starck "F7TX") coated onto a rayon backing.

EXAMPLE 51 AND COMPARATIVE EXAMPLE C51

This set of examples illustrated the benefit of using green silicon carbide as the abrasive particle in compositions and articles of the invention.

Example 51 and Comparative Example C51 utilized coatable compositions consisting of 3900 grams abrasive mineral (type as indicated in Table 16), 60 grams amorphous silica known under the trade designation "OX-50", 60 grams coupling agent known under the trade designation "A-174", and 1980 grams resin (70 parts TMPTA, 30 parts TATHEIC, 1 part photoinitiator known under the trade designation "Irgacure 369". These coatable compositions were coated onto a 14 mil (0.358 mm) polypropylene variable pitch production tool having an asymmetric triangular pyramidal pattern, 0.53 mm in height, having two of the base edges being about 1.06 mm in length and the other edge being 1.18 mm in length, with the base edges abutted against one another. The coatable compositions were mixed with a high shear mixer and knife coated onto the polypropylene tooling. The backing used for each of Examples 51 and Comparative Example C51 was a rayon cloth backing treated with a phenolic/latex presize resin. The tooling mandrel (location where the product was cured and transferred to the cloth backing) was heated to 45° C. Two 600 watt/2.54 cm "V" Fusion Systems lamps were used in each case to cure the compositions, at a run speed of 50 feet per minute. The products were then post cured at 112° C. for 14 hours to more completely cure the phenolic presize.

The type of abrasive used in each example and the cut data are tabulated in Table 16. Test Procedure II was utilized for grinding, except that titanium workpieces were used, the serated rubber contact wheel had a 65 Shore A durometer, and the belts were run at 825 RPM. The initial reading was taken after 30 seconds for both Example 51 and Comparative Example C51 (rather than after 1 minute), and the endpoint for total cut reading for Example 51 was when the cut for the test belt was only ⅓ that of the initial cut of the belt of Comparative Example C51.

The type of abrasive used in each example and the cut data are tabulated in Table 16. From the data in Table 16 it can be seen that improvement in cut performance on a very hard metal (titanium) was achieved when using green silicon carbide as the abrasive mineral compared with a standard make/size coated abrasive known under the trade designation "3M-ite", grade 311E, employing heat treated aluminum oxide (brown).

TABLE 16

| Example | Mineral Type | Initial Cut (g) | Total Cut (g) |
|---|---|---|---|
| 51 | P-400 GSC[1] | 0.85 | 8.9 |
| C51 | P-400 311E[2] | 0.9 | 6.6 |

[1] green silicon carbide having 22.1 micrometer average particle size.
[2] Standard coated abrasive using phenolic make/size construction, available from 3M under the trade designation "Tri-M-ite" grade 201E, employing P-320 grade (average particle size 34.3 micrometers) heat treated aluminum oxide (gray), available from Starck GmbH & Co., Berlin, Germany, under the trade designation "F7TX", coated onto a rayon backing.

EXAMPLE 52

This example was performed to illustrate the "depth of cure" achievable using photoinitiator systems consisting essentially of a compound which cleaves via α-cleavage and having molar absorptivity as described herein.

Example 52 utilized a coatable composition consisting of 4080 grams abrasive mineral (P-120 grade heat treated aluminum oxide (brown) having 116 micrometer average particle size), 120 grams amorphous silica known under the trade designation "OX-50", 60 grams coupling agent known under the trade designation "A-174", 300 grams $KBF_4$ grinding aid, and 1440 grams resin (70 parts TMPTA, 30 parts TATHEIC, 1 part photoinitiator known under the trade designation "Irgacure 369"). This coatable composition was coated onto a 28 mils (0.711 mm) polypropylene production tool having a square base pyramidal pattern, 0.711 mm in height, having two of the base edges being about 1.41 mm in length and the other edge being 1.57 mm in length, with the base edges abutted against one another. The coatable composition was mixed with a high shear mixer and knife coated into the polypropylene tooling. The backing used was 5 mils (0.127 mm) thick polyethylene terephthalate (PET) film which was primed on the side which receive the coatable composition with a coating 0.8 mil (0.02 mm) of ethylene acrylic acid copolymer to promote adhesion of the composition and resulting abrasive composite to the film. One 600 watt/2.54 cm "V" Fusion Systems lamp was used to cure the composition at a web speed of 100 ft/min (30.5 meters/min). Precisely shaped particles were generated having length dimension of 28 mils (0.716 mm) by exposing the cured composite to a 20,000 Hz ultrasonic horn, thus separating the individual precisely shaped abrasive particles from the PET film. This example showed that thicknesses up to 28 mils (0.711 mm) can be cured using photoinitiator systems including initiators such as "Irgacure 369" when employing dark colored abrasive particles.

COMPARATIVE EXAMPLES C52–C57

These examples illustrated that use of photoinitiators systems not including a compound which cleaves via α-cleavage and having a molar absorptivity in dilute methanol solution ranging from about 4 to about 400 liter/mole-cm in at least some portion of the UV/visible spectrum ranging from about 395 nanometers to about 500 nanometers can not be used to produce preferred (i.e. thick) abrasive products.

Comparative Examples C52–C57 utilized a coatable composition consisting of 70 grams abrasive mineral (P-300 grade heat treated aluminum oxide (gray) having average particle size of about 40 micrometers), 0.5 gram coupling agent known under the trade designation "A-174", and 29.5 grams resin (50 parts TMPTA, 50 parts TATHEIC, 2 parts photoinitiator known under the trade designation "Irgacure 651"). Examples C52–C57 were generated by placing the coatable composition between two layers of PET film and setting a gap with a knife coater to generate either 7, 14 or 21 mil (0.178, 0.355 and 0.533 mm, respectively) thickness of the composition. One 600 watt/2.54 cm "D" Fusion Systems lamp was used in each case to cure the composition. Two different web speeds were employed: 100 feet/min and 25 feet/min (30.5 and 7.63 meters.min, respectively), as detailed in Table 17.

The data in Table 17 illustrate that the photoinitiator known under the trade designation "Irgacure 651" did not allow for coatable compositions to be cured at high web speeds or at thicknesses that would make the most preferred abrasive articles. The only composition/thickness/web speed combination that cured was that of Comparative Example C54. It is preferred that web speeds be on the order of about 45–60 meter/min.

TABLE 17

| Comp. Example | sample thickness (mm) | web speed (meters/min) | cure (yes/no) |
| --- | --- | --- | --- |
| C52 | 0.533 | 7.63 | no |
| C53 | 0.355 | 7.63 | no |
| C54 | 0.178 | 7.63 | yes |
| C55 | 0.533 | 30.5 | no |
| C56 | 0.355 | 30.5 | no |
| C57 | 0.178 | 30.5 | no |

EXAMPLES 59–60 AND COMPARATIVE EXAMPLE C58

These examples demonstrated the increased cut performance of structured abrasive articles on 304 stainless steel when going from 7 mil (0.179 mm) thickness to 14 mil (0.358 mm) thickness using dark abrasive minerals.

Examples 59–60 and Comparative Example C58 utilized coatable compositions consisting of 2940 grams abrasive mineral (type as indicated in Table 18), 60 grams amorphous silica known under the trade designation "OX-50", 60 grams coupling agent known under the trade designation "A-174", 1200 grams $KBF_4$ grinding aid, and 1740 grams resin (70 parts TMPTA, 30 parts TATHEIC, 1 part photoinitiator known under the trade designation "Irgacure 369"). These coatable compositions were coated onto 7 mil (0.179 mm) or 14 mil (0.358 mm) polypropylene production tools, the former having an asymmetric triangular pyramidal pattern, 0.53 mm in height, having two of the base edges being about 1.06 mm in length and the other edge being 1.18 mm in length, with the base edges abutted against one another, and the latter being a variable pitch construction. The coatable compositions were mixed with a high shear mixer and knife coated onto the polypropylene tooling in each case. The backing used for each of Examples 59–60 and Comparative Example C58 was a rayon cloth backing treated with a phenolic/latex presize resin. The tooling mandrel (location where the product was cured and transferred to the cloth backing) was heated to 45° C. One 600 watt/2.54 cm "V" Fusion Systems lamp was used in each case to cure the compositions, at a run speed of 50 feet per minute. The products were then post cured at 112° C. for 14 hours to more completely cure the phenolic presize.

The type of abrasive used in each example and the cut data are tabulated in Table 18 for cutting 304 stainless steel. Test Procedure II was utilized for grinding, except that the belt was run at 1500 RPM and with a 65 Shore A durometer rubber contact wheel. The initial reading was taken after 30 seconds for all of Examples 59–60 and Comparative Example C58 (rather than after 1 minute), and the endpoint for total cut was when the cut for the test belt was only ⅓ that of the initial cut of the belt of Comparative Example C58, or upon burning of the belt.

TABLE 18

| Example No. | Tool topography* | abrasive particles** | initial cut (g) | total cut (g) |
| --- | --- | --- | --- | --- |
| 59 | 1 | P-320 F7TX | 9.7 | 135.4 |
| C59 | — | P-320 F7TX | 6.25 | 68.9 |
| 60 | 2 | P-320 F7TX | 10.3 | 110.9 |

*"1" signifies same tooling as used in Example 51; "2" signifies same tooling as used in Examples 47–50.
**see Table 15, footnote 2.

The data in Table 18 for Examples 59 and 60 may be compared with the data for Comparative Examples C52–C57 regarding cure depth, while the data in Table 18 for Examples 59 and 60 may be compared with the data for Example C58 in terms of cutting performance. It can be seen that a major improvement in cure depth was achieved utilizing a photoinitiator system which included at least one compound having molar absorptivity ranging from about 4 to about 400 in dilute methanol solution. This in turn translated into better cut performance on 304 stainless steel when using the higher topography abrasive (Example 59 used 14 mil topography while Example 60 utilized 7 mil topography), and both Examples 59 and 60 were better performing than the abrasive of Comparative Example C58. The advantage of using the photoinitiator "Irgacure 369" and similar photoinitiators is evident.

EXAMPLE 61

The coatable composition used in this example was similar to that used in Example 52 with the following changes: 4320 grams of garnet (reddish brown) was used as the abrasive particle, rather than 4080 grams of heat treated aluminum oxide (brown); 1680 grams of resin was employed, rather than 1440 grams; and no $KBF_4$ grinding aid was used. The coatable composition was cured and released from the tooling transferring to the PET film, after which the particles were separated from the film with an ultrasonic horn as explained in Example 52.

The data of the invention illustrated that the inventive abrasive articles and methods of making same are useful, novel, and nonobvious since increased web speeds and dark minerals may be used in relatively thick constructions (up to 28 mils or about 0.711 mm). Thus, the more efficacious dark minerals may be employed whereas before only white aluminum oxide could be used.

Various modifications and alterations of this invention will become apparent to those skilled in the art without departing from the scope of the appended claims, and it should be understood that this invention is not to be unduly limited to the illustrative embodiments set forth herein.

What is claimed is:

1. An abrasive article comprising a plurality of abrasive particles adhered together by a binder comprising a photoinitiated free radically polymerizable resin initiated by at least one photoinitiator cleavable via or α-cleavage and having a molecular absorptivity in a dilute methanol solution ranging from about 4 to about 400 liter/mole-cm in at least one portion of the UV/visible spectrum ranging from about 395 to about 500 nanometers.

2. The abrasive article of claim 1 wherein the abrasive particles are selected from the group consisting of flint, garnet, silicon carbide, ceria, iron oxide, cubic boron nitride, alumina zirconia, silicon nitride, aluminum oxide, diamond, and combinations thereof.

3. The abrasive article of claim 1 wherein the at least one photoinitiator is an α-amino acetophenone.

4. The abrasive article of claim 3 wherein the α-amino acetophenone is selected from the group consisting of 2-benzyl-2-dimethylamino-1-(4-morpholinophenyl)-1-butan-1-one, 1-[4-(2-hydryoxyethylthio)phenyl]-2-methyl-2-morpholinopropan-1-one, 1-(4-mercaptophenyl)-2-methyl-2-morpholinopropan-1-one, 1-(4-allythiophenyl)-2-methyl-2-morpholinopropan-1-one, 1-[4-(2-methoxycarbonylethylthio)-phenyl]-2-methyl-2-morpholinopropan-1-one, 1-[4-dimethylaminomethylthio)-phenyl]-2-morpholinopropan-1-one, 2-methyl-1-[4-(methylthio)-phenyl]2-morpholinopropan-1-one, 2-methyl-1-[4-(methylthio)-phenyl]-2-piperidinopropan-1-one.

5. The abrasive article of claim 3 wherein the α-amino acetophenone is 2-benzyl-2-dimethylamino-1-(4-morpholinophenyl)-butan-1-one.

6. The abrasive article of claim 1 wherein the photoinitiated free radically polymerizable resin is initiated by the at least one photoinitiator and at least one photosensitizer.

7. The abrasive article of claim 6 wherein the photosensitizer is a thioxanthone derivative.

8. The abrasive article of claim 3 wherein the α-amino acetophenone is 2-methyl-1-(4-[methylthio]phenyl)-2-(4-morpholinyl)-propan-1-one.

9. The abrasive article of claim 1 wherein the photoinitiated free radically polymerizable resin is initiated by the at least one photoinitiator cleavable via α-cleavage and at least one photoinitiator cleavable via non-α-cleavage.

10. The abrasive article of claim 1 wherein the photoinitiated free radically polymerizable resin is initiated by the at least one photoinitiator cleavable via α-cleavage and at least one bimolecular photoinitiator.

11. The abrasive article of claim 1 wherein the at least one photoinitiator is an acylphosphine oxide.

12. The abrasive article of claim 1 wherein the photoinitiated free radically polymerizable resin is initiated by the at least one photoinitiator cleavable via α-cleavage and at least one cationic initiator.

13. The abrasive article of claim 1 wherein the photoinitiated free radically polymerized resin consists of polymerized units of materials having at least one ethylenically unsaturated group selected from the group consisting of aminoplast resins having at least one pendant organic radical which is ethylenically unsaturated, acrylated isocyanurate resins, acrylated urethane resins, acrylated epoxy resins, N-vinyl-pyrrolidone, hexanediol diacrylate, triethylene glycol diacrylate, trimethylol propane triacrylate tetrahydrofurfuryl acrylate, and pentaerythritol triacrylate.

14. The abrasive article of claim 13 wherein the material having at the least one ethylenically unsaturated group is a copolymer of triacrylate of tris(hydroxyethyl) isocyanurate and trimethylol propane triacrylate.

15. The abrasive article of claim 1 wherein the abrasive particles comprise from about 50 to about 85 weight percent, and the photoinitiated free radically polymerized resin comprises from about 10 to about 45 weight percent of the abrasive article, all weight percentages based on total dry weight of the abrasive article.

16. A nonwoven abrasive article comprising an open, lofty, three-dimensional network of fibers bound together at points when they contact with a binder comprising a photoinitiated free radically polymerized resin initiated by at least one photoinitiator cleavable via α-cleavage and having a molar absorptivity in dilute methanol solution ranging from about 4 to about 400 liter/mole-cm in at least some portion of the UV/visible spectrum ranging from about 395 nanometers to about 500 nanometers.

17. The nonwoven abrasive article of claim 16 further comprising a plurality of abrasive particles bound to at least some of the fibers by a second binder, either the first, second, or both binders comprising a photoinitiated free radically polymerized resin initiated by at least one photoinitiator cleavable via α-cleavage and having a molar absorptivity in dilute methanol solution ranging from about 4 to about 400 liter/mole-cm in at least some portion of the UV/visible spectrum ranging from about 395 nanometers to about 500 nanometers.

18. The abrasive article of claim 15 including from about 0.1 part to about 2 parts polymeric colorant, based on dry weight of the abrasive article, the polymeric colorant selected from the group consisting of polymers within the generic formula:

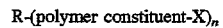

R-(polymer constituent-X)$_n$ wherein R is an organic dyestuff radical; the polymeric constituent is selected from polyalkyleneoxides and copolymers of polyalkylene oxides in which the alkylene moiety of the polymeric constituent contains 2 or more carbon atoms and the polymeric constituent has a average molecular weight of from about 44 to about 1500; n is an integer of from about 1 to about 6; and X is selected from —OH, —NH$_n$ and —SH.

19. The abrasive article of claim 1 wherein the free radically polymerized resin comprises R-terminal polymerized units ethylenically unsaturated compounds, wherein R is a residue of the at least one photoinitiator.

20. The abrasive article of claim 19 wherein the abrasive particles are selected from the group consisting of flint, garnet, silicon carbide, ceria, iron oxide, cubic boron nitride, alumina zirconia, silicon nitride, aluminum oxide, diamond, and combinations thereof.

21. The abrasive article of claim 19 wherein the at least one photoinitiator is an α-amino acetophenone.

22. The abrasive article of claim 21 wherein the α-amino acetophenone is selected from the group of consisting of 2-benzyl-2-dimethylamino-1-(4-morpholinophenyl)-1-butan-1-one, 1-[4-(2-hydroxyethylthio)phenyl]-2-methyl-2-morpholinopropan-1-one, 1-(4-mercaptophenyl)-2-methyl-2-morpholinopropan-1-one, 1-(4-allylthiophenyl)-2-methyl-2-morpholinopropan-1-one, 1-[4-(2-methoxycarbonylethylthio)-phenyl]-2-methyl-2-morpholinopropan-1-one, 1-[4-(dimethylaminomethylthio)-phenyl]-2-morpholinopropan-1-one, 2-methyl-1-(4-[methylthio]phenyl)-2-(4-morpholinyl)-propan-1-one, and 2-methyl-1-[4-(methylthio)-phenyl]-2-piperidinopropan-1-one.

23. The abrasive article of claim 23 wherein the α-amino acetophenone is 2-benzyl-2-dimethylamino-1-(4-morpholinophenyl)-butan-1-one.

24. The abrasive article of claim 22 wherein the α-amino acetophenone is 2-methyl-1-(4-[methylthio]phenyl)-2-(4-morpholinyl)-propan-1-one.

25. The abrasive article of claim 19 wherein the binder comprises a second photoinitiated free radically polymerized resin comprising R'-terminated polymerized units of ethylenically unsaturated compounds, wherein R' is a residue of a second photoinitiator cleavable via non-α-cleavage.

26. The abrasive article of claim 19 wherein the at least one photoinitiator is an acylphosphine oxide.

27. The abrasive article of claim 19 wherein the first photoinitiated free radically polymerized resin consists of polymerized units of materials having at least one ethylenically unsaturated group selected from the group consisting of aminoplast resins having at least one pendant organic radical which is ethylenically unsaturated, acrylated isocyanurate resins, acrylated urethane resins, acrylated epoxy resins, N-vinyl-pyrrolidone, hexanediol diacrylate, triethylene glycol diacrylate, trimethylol propane triacrylate tetrahydrofurfuryl acrylate, and pentaerythritol triacrylate.

28. The abrasive article of claim 27 wherein the material having the at least one ethylenically unsaturated group is a copolymer of triacrylate of tris(hydroxyethyl)isocyanurate and trimethylol propane triacrylate.

29. The abrasive article of claim 19 wherein the abrasive particles comprise from about 50 to about 85 weight percent, and the first photoinitiated free radically polymerized resin comprises from about 10 to about 45 weight percent of the abrasive article, all weight percentages based on total dry weight of the abrasive article.

30. The abrasive article of claim 1 further comprising a backing wherein the plurality of particles adhered together by the binder form an adhesive coating on the backing.

31. The abrasive article of claim 1 wherein the adhesive coating comprises a plurality of precisely shaped composites having at least one shape.

32. The abrasive article of claim 31 wherein the at least one shape is a pyramid.

33. The abrasive article of claim 1 further comprising:

a backing having a front surface and a back surface;

a make coating present on the front surface of the backing;

the plurality of abrasive particles adhered to the backing by the make coating; and a size coating present over the abrasive particles; wherein at least one of the make and size coatings comprises the binder.

34. The abrasive article of claim 33 wherein a total dry weight of the abrasive article comprises about 50 weight percent to about 85 weight percent abrasive particles and about 10 weight percent to about 45 weight percent of the photoinitiated free radically polymerized resin in the make coating and the size coating.

35. An improved abrasive article including a plurality of non-white abrasive particles adhered together by a free radically polymerizable resin binder, wherein the improvement comprises the free radically polymerizable resin binder initiated by at least one photoinitiator cleavable via α-cleavage and having a molar absorptivity in dilute methanol solution ranging from about 4 to about 400 liter/mole-cm in at least some portion of the UV/visible spectrum ranging from about 395 to about 500 nanometers.

36. The improved abrasive article of claim 35 wherein the at least one photo initiator is an α-amino acetophenone.

37. The improved abrasive article of claim 36 wherein the α-amino acetophenone is selected from the group of 2-benzyl-2-dimethylamino-1-(4-morpholinophenyl)-1-butan-1-one, 1-[4-(2-hydroxyethylthio)phenyl]-2-methyl-2-morpholinopropan-1-one, 1-(4-mercaptophenyl)-2-methyl-2-morpholinopropan-1-one, 1-(4-allylthiophenyl)-2-methyl-2-morpholinopropan-1-one, 1-[4-(2-methoxycarbonylethylthio)-phenyl]-2-methyl-2-morpholinopropan-1-one, 1-[4-(dimethylaminomethylthio)-phenyl]-2-morpholinopropan-1-one, 2-methyl-1-[4-(methylthio)phenyl]-2-morpholinopropan-1-one, and 2-methyl-1-[4-(methylthio)-phenyl]-2-piperidinopropan-1-one.

38. The improved abrasive article of claim 35 wherein the at least one photoinitiator is selected from the group of 2-benzyl-2-dimethylamino-1-(4-morpholinophenyl)-1-butan-1-one, 2-methyl-1-[4-(methylthio)-phenyl]-2-morpholinopropan-1-one, an acylphosphine oxide, and mixtures thereof.

39. The improved abrasive article of claim 35 wherein the improvement further comprises the free radically polymerizable resin binder initiated by at least other photoinitiator selected from the group of a non-α-cleavage photoinitiator, a bimolecular photoinitiator, a cationic initiator, and mixtures thereof.

40. An improved nonwoven abrasive article including an open, lofty, three-dimensional network of fibers bound together at points where they contact a free radically polymerizable resin binder and a plurality of non-white abrasive particles bound to at least some of the fibers by a second binder, wherein the improvement comprises either the first, second, or both binders comprising a free radically polymerizable resin binder initiated by at least one photoinitiator cleavable via α-cleavage and having a molar absorptivity in dilute methanol solution ranging from about 4 to about 400 liter/mole-cm in at least some portion of the UV/visible spectrum ranging from about 395 to about 500 nanometers.

* * * * *

UNITED STATES PATENT AND TRADEMARK OFFICE
CERTIFICATE OF CORRECTION

PATENT NO.: 5,667,541
DATED: September 16, 1997
INVENTOR(S): Thomas P. Klun, Louis D. Hibbard, Kathryn M. Spurgeon and Scott R. Culler It is certified that error appears in the above-identified patent and that said Letters Patent is hereby corrected as shown below:

Title Page, Section [54] "COATABLE COMPOSITIONS ABRASIVE ARTICLES MADE THEREFROM, AND METHODS OF MAKING AND USING SAME" should read --COATABLE COMPOSITIONS, ABRASIVE ARTICLES MADE THEREFROM, AND METHODS OF MAKING AND USING SAME--

Title Page, Section [75] Inventors: "Thomas P. Klun, Lakeland Township, Washington County; Louis D. Hibbard, Eagan; Kathryn M. Spurgeon, River Falls; Scott R. Culler, Burnsville, all of Minn." should read --Thomas P. Klun, Lakeland Township; Louis D. Hibbard, Eagan; both of Minn.; Kathryn M. Spurgeon, River Falls, Wis.; Scott R. Culler, Burnsville, Minn.--

Col. 3, line 53    "fist" should read --first--

Col. 6, line 56    "(termed herein "coinitiator"" should read --(termed herein "coinitiator")--

Col. 8, line 49    "zero < $E_{ox}$ (donor) $\geq$ $E_{ox}$ (p-dimethoxybenzene" should read --zero < $E_{ox}$ (donor) $\leq$ $E_{ox}$ (p-dimethoxybenzene)--

Col. 20, line 43    delete "copending"

Col. 20, line 48    delete "pending"

Col. 47, line 41    ""Irgacure 369"." should read --"Irgacure 369").--

UNITED STATES PATENT AND TRADEMARK OFFICE
CERTIFICATE OF CORRECTION

PATENT NO.: 5,667,541

DATED: September 16, 1997

Page 2 of 2

INVENTOR(S): Thomas P. Klun, Louis D. Hibbard, Kathryn M. Spurgeon and Scott R. Culler It is certified that error appears in the above-identified patent and that said Letters Patent is hereby corrected as shown below:

Col. 50, Table 18     Under Example No. "C59" should read --C58--

Col. 51, lines 22-23     "1-[4-dimethylaminomethylthio)-phenyl]-2-morpholinopropan-1-one" should read
--1-[4-(dimethylaminomethylthio)-phenyl]-2-morpholinopropan-1-one--

Col. 52, line 60     "claim 23" should read --claim 22--

Signed and Sealed this

First Day of December, 1998

Attest:

BRUCE LEHMAN

Attesting Officer

Commissioner of Patents and Trademarks